United States Patent
Igo et al.

(10) Patent No.: US 11,147,136 B1
(45) Date of Patent: Oct. 12, 2021

(54) SYSTEMS AND APPARATUSES FOR CONFIGURABLE AND CONTROLLABLE UNDER CABINET LIGHTING FIXTURES

(71) Applicant: Feit Electric Company, Inc., Pico Rivera, CA (US)

(72) Inventors: Shane Igo, Pico Rivera, CA (US); Alan Feit, Encino, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

(21) Appl. No.: 17/116,393

(22) Filed: Dec. 9, 2020

(51) Int. Cl.
*H05B 45/30* (2020.01)
*F21S 4/20* (2016.01)
(Continued)

(52) U.S. Cl.
CPC ............. *H05B 45/30* (2020.01); *F21S 4/20* (2016.01); *H05B 47/115* (2020.01); *H05B 47/19* (2020.01);
(Continued)

(58) Field of Classification Search
CPC ........ H05B 45/20; H05B 47/19; H05B 45/10; H05B 45/24; H05B 39/088; H05B 45/12; H05B 45/22; H05B 47/10; H05B 47/105; H05B 47/11; H05B 47/18; H05B 47/185; H05B 47/195; H05B 47/175; F21V 23/04; F21V 29/70; F21V 3/00; F21V 3/02;
(Continued)

(56) References Cited

U.S. PATENT DOCUMENTS 6,127,783 A  10/2000  Pashley et al.
6,149,283 A  11/2000  Conway et al.
(Continued)

FOREIGN PATENT DOCUMENTS

CN  201844227 U  5/2011
CN  204069421 U  12/2014
(Continued)

OTHER PUBLICATIONS

Coolux, "Once Again Another Technology Breakthrough of LED Edgt-Lit Panel: The DIP-DIM Panel, 4 Wattage & 3 Color Switchable 130 LM/W", brochure distributed at LIGHTFAIR International 2016 Booth #1111, Apr. 26-28, 2016, 4 pages, San Diego, California.
(Continued)

*Primary Examiner* — Monica C King
(74) *Attorney, Agent, or Firm* — Alston & Bird LLP

(57) ABSTRACT

A configurable controllable under cabinet lighting fixture and system for controlling the same are provided. An example configurable controllable under cabinet lighting fixture includes one or more lighting elements positioned from a proximal end of a lighting fixture housing to a distal end of a lighting fixture housing. The example configurable controllable under cabinet lighting fixture further includes circuitry configured to control one or more first parameters associated with the one or more lighting elements. The circuitry is further configured to control one or more second parameters associated with one or more nearby configurable controllable under cabinet lighting fixtures located within a proximity threshold of the configurable controllable under cabinet lighting fixture. The lighting fixture housing is configured for affixing to a downward facing surface of a mounting surface.

28 Claims, 24 Drawing Sheets

(51) Int. Cl.
*H05B 47/115* (2020.01)
*H05B 47/19* (2020.01)
*F21Y 103/10* (2016.01)
*F21Y 115/10* (2016.01)

(52) U.S. Cl.
CPC ....... *F21Y 2103/10* (2016.08); *F21Y 2115/10* (2016.08)

(58) Field of Classification Search
CPC .......... F21V 7/00; F21V 15/01; F21V 15/015; F21V 17/12; F21V 19/002; F21V 19/006; F21V 19/008; F21V 21/005; F21V 21/049; F21V 21/088; F21V 23/001; F21V 23/003; F21V 23/005; F21V 23/009; F21V 23/02; F21V 23/06; F21V 29/507; F21V 29/74; F21V 29/77; F21V 5/04

See application file for complete search history.

(56) References Cited

U.S. PATENT DOCUMENTS

| | | |
|---|---|---|
| 6,201,351 B1 | 3/2001 | Rudolph et al. |
| 6,357,889 B1 | 3/2002 | Duggal et al. |
| 6,834,981 B2 | 12/2004 | Nagai et al. |
| 7,014,336 B1 | 3/2006 | Ducharme et al. |
| 7,083,293 B2 | 8/2006 | Kalinski |
| 7,201,489 B2 | 4/2007 | Shyu |
| 7,255,457 B2 | 8/2007 | Ducharme et al. |
| 7,288,902 B1 | 10/2007 | Melanson |
| 7,405,715 B2 | 7/2008 | Guzman et al. |
| 7,416,312 B1 | 8/2008 | McDermott |
| 7,484,860 B2 | 2/2009 | Demarest et al. |
| 7,520,634 B2 | 4/2009 | Ducharme et al. |
| 7,521,667 B2 | 4/2009 | Rains, Jr. et al. |
| 7,659,674 B2 | 2/2010 | Mueller et al. |
| 7,883,239 B2 | 2/2011 | Rains, Jr. et al. |
| 7,926,300 B2 | 4/2011 | Roberts et al. |
| 7,988,327 B1 | 8/2011 | Knoble et al. |
| 8,044,608 B2 | 10/2011 | Kuo et al. |
| 8,076,867 B2 | 12/2011 | Kuo et al. |
| 8,111,017 B2 | 2/2012 | Lin et al. |
| 8,159,125 B2 | 4/2012 | Miao |
| 8,172,415 B2 | 5/2012 | Wegh et al. |
| 8,207,821 B2 | 6/2012 | Roberge et al. |
| 8,220,970 B1 | 7/2012 | Khazi et al. |
| 8,305,013 B2 | 11/2012 | Lin et al. |
| 8,314,571 B2 | 11/2012 | Jonsson |
| 8,317,362 B2 | 11/2012 | Ku et al. |
| 8,330,388 B2 | 12/2012 | Kuo et al. |
| 8,339,063 B2 | 12/2012 | Yan et al. |
| 8,339,067 B2 | 12/2012 | Lin et al. |
| 8,378,588 B2 | 2/2013 | Kuo et al. |
| 8,378,589 B2 | 2/2013 | Kuo et al. |
| 8,430,402 B2 | 4/2013 | Diehl et al. |
| 8,482,219 B2 | 7/2013 | Kuo et al. |
| 8,508,150 B2 | 8/2013 | Kuo et al. |
| 8,598,793 B2 | 12/2013 | Yan et al. |
| 8,664,895 B2 | 3/2014 | Yan et al. |
| 8,669,722 B2 | 3/2014 | Yeh et al. |
| 8,729,812 B2 | 5/2014 | Kuwu |
| 8,853,950 B1 | 10/2014 | Chang |
| 8,872,438 B2 | 10/2014 | Zhou et al. |
| 8,884,508 B2 | 11/2014 | Pickard et al. |
| 8,890,440 B2 | 11/2014 | Yan et al. |
| 8,941,312 B2 | 1/2015 | McRae |
| 8,947,013 B2 | 2/2015 | Sutardja et al. |
| 9,030,122 B2 | 5/2015 | Yan et al. |
| 9,072,148 B2 | 6/2015 | Tanaka et al. |
| 9,119,252 B2 | 8/2015 | Wu |
| 9,144,129 B2 | 9/2015 | Munday |
| 9,232,591 B2 | 1/2016 | Kuo et al. |
| 9,232,602 B2 | 1/2016 | Yeh et al. |
| 9,253,843 B2 | 2/2016 | Lee et al. |
| 9,386,653 B2 | 7/2016 | Kuo et al. |
| 9,441,801 B1 | 9/2016 | Myers et al. |
| 9,642,208 B2 | 5/2017 | Van De Ven |
| 9,713,211 B2 | 7/2017 | Van De Ven et al. |
| 9,730,291 B1 | 8/2017 | Janik et al. |
| 9,781,793 B2 | 10/2017 | Yan et al. |
| 9,786,639 B2 | 10/2017 | Bergmann et al. |
| 9,799,125 B1 | 10/2017 | Wegner et al. |
| 9,801,250 B1 | 10/2017 | Halliwell |
| 9,820,350 B2 | 11/2017 | Pyshos et al. |
| 9,892,693 B1 | 2/2018 | Kumar et al. |
| 9,900,945 B1 | 2/2018 | Janik et al. |
| 9,909,723 B2 | 3/2018 | Bergmann et al. |
| 9,924,582 B2 | 3/2018 | Vendetti et al. |
| 9,974,138 B2 | 5/2018 | Allen et al. |
| 10,008,484 B2 | 6/2018 | Bergmann et al. |
| 10,009,971 B2 | 6/2018 | Chobot et al. |
| 10,018,346 B2 | 7/2018 | Van De Ven et al. |
| 10,076,011 B1 | 9/2018 | Amidi et al. |
| 10,091,855 B2 | 10/2018 | Van Winkle |
| 10,104,742 B2 | 10/2018 | Halliwell |
| 10,117,300 B2 | 10/2018 | Doheny et al. |
| 10,136,503 B2 | 11/2018 | Chen |
| 10,163,405 B2 | 12/2018 | Kumar et al. |
| 10,231,300 B2 | 3/2019 | Cash et al. |
| 10,278,250 B2 | 4/2019 | Mcbryde et al. |
| 10,290,265 B2 | 5/2019 | Kumar et al. |
| 10,292,233 B1 | 5/2019 | Udavant et al. |
| 10,299,335 B2 | 5/2019 | Pyshos et al. |
| 10,299,336 B2 | 5/2019 | Bowen et al. |
| 10,334,678 B2 | 6/2019 | Janik et al. |
| 10,433,390 B2 | 10/2019 | Halliwell |
| 10,462,871 B2 | 10/2019 | Van Winkle |
| 10,492,262 B2 | 11/2019 | Van Winkle |
| 10,602,584 B2 | 3/2020 | Pyshos et al. |
| 10,683,969 B2 | 6/2020 | Jeswani et al. |
| 10,893,587 B2 | 1/2021 | Halliwell |
| 10,904,969 B2 | 1/2021 | Halliwell |
| 2002/0048169 A1 | 4/2002 | Dowling et al. |
| 2002/0071279 A1 | 6/2002 | Katogi et al. |
| 2004/0264187 A1 | 12/2004 | Vanderschuit |
| 2005/0012457 A1 | 1/2005 | Wu |
| 2005/0077837 A1 | 4/2005 | Kim et al. |
| 2005/0128751 A1 | 6/2005 | Roberge et al. |
| 2005/0270780 A1 | 12/2005 | Zhang |
| 2005/0285547 A1 | 12/2005 | Piepgras et al. |
| 2006/0220586 A1 | 10/2006 | Latham |
| 2006/0237636 A1 | 10/2006 | Lyons et al. |
| 2006/0238136 A1 | 10/2006 | Johnson, III et al. |
| 2007/0247840 A1 | 10/2007 | Ham |
| 2007/0273290 A1 | 11/2007 | Ashdown et al. |
| 2008/0060917 A1 | 3/2008 | Chen et al. |
| 2008/0106893 A1 | 5/2008 | Johnson et al. |
| 2009/0052170 A1 | 2/2009 | Jeng et al. |
| 2010/0237798 A1 | 9/2010 | Wolf et al. |
| 2010/0328946 A1 | 12/2010 | Borkar et al. |
| 2011/0193479 A1 | 8/2011 | Nilssen et al. |
| 2012/0306377 A1 | 12/2012 | Igaki et al. |
| 2012/0327660 A1 | 12/2012 | Lin |
| 2013/0003417 A1 | 1/2013 | Chien et al. |
| 2013/0038244 A1 | 2/2013 | Kamii et al. |
| 2013/0114241 A1 | 5/2013 | Van De Ven et al. |
| 2013/0147359 A1 | 6/2013 | Chobot |
| 2013/0154510 A1 | 6/2013 | Sutardja et al. |
| 2013/0201668 A1 | 8/2013 | Chien et al. |
| 2013/0270999 A1 | 10/2013 | Ramer et al. |
| 2013/0328503 A1 | 12/2013 | Toda |
| 2014/0049972 A1 | 2/2014 | McGuire et al. |
| 2014/0070700 A1 | 3/2014 | Genthon et al. |
| 2014/0184080 A1 | 7/2014 | Rybicki et al. |
| 2014/0210357 A1 | 7/2014 | Yan et al. |
| 2014/0210376 A1 | 7/2014 | Hicks, IV |
| 2014/0239811 A1 | 8/2014 | Kreiner |
| 2014/0264406 A1 | 9/2014 | Muehlbacher et al. |
| 2014/0361696 A1 | 12/2014 | Siessegger et al. |
| 2014/0364219 A1 | 12/2014 | Matsushita et al. |
| 2015/0029712 A1 | 1/2015 | Nakamura et al. |
| 2015/0048758 A1 | 2/2015 | Carrigan et al. |
| 2015/0054410 A1 | 2/2015 | Sanders et al. |

(56) References Cited

U.S. PATENT DOCUMENTS

| | | |
|---|---|---|
| 2015/0070897 A1 | 3/2015 | Chien |
| 2015/0276204 A1 | 10/2015 | Ray |
| 2015/0296577 A1 | 10/2015 | Chen |
| 2016/0286633 A1 | 9/2016 | Juslen |
| 2016/0316527 A1 | 10/2016 | Allen et al. |
| 2017/0019973 A1 | 1/2017 | Beck et al. |
| 2017/0080849 A1 | 3/2017 | Nogha et al. |
| 2017/0086265 A1 | 3/2017 | Akiyama et al. |
| 2017/0105265 A1 | 4/2017 | Sadwick |
| 2017/0181241 A1 | 6/2017 | Koo |
| 2017/0227174 A1 | 8/2017 | May |
| 2017/0303363 A1 | 10/2017 | Pyshos et al. |
| 2017/0354022 A1 | 12/2017 | Dimberg et al. |
| 2018/0092183 A1 | 3/2018 | Halliwell |
| 2018/0206305 A1 | 7/2018 | Van Winkle |

FOREIGN PATENT DOCUMENTS

| | | |
|---|---|---|
| CN | 105221949 A | 1/2016 |
| DE | 202011103835 U1 | 12/2011 |
| JP | 2013254666 A | 12/2013 |

OTHER PUBLICATIONS

Gisteq Corp., "GiSTEQ Flashmate F-160 & F-198," YouTube, https://www.youtube.com/watch?v=59Tf4CwF2oU, Aug. 8, 2013.

Hampton Bay, Use and Care Guide, LED Universal Ceiling Fan Light Kit, retrieved from https://images.homedepot-static.com/catalog/pdfImages/8f/8fbdd564-5722-4e5d-b579-e231a0848dd5.pdf on Jun. 12, 2020.

MSI Solid State Lighting, "Introducing PowerBand™ Variable Wattage Technology", retrieved from <https://www.1000bulbs.com/pdf/led-ipar3843101d-powerband.pdf> on Jan. 11, 2017, 1 page.

MSI Solid State Lighting, "iPAR™ 38 with Powerband Technology", retrieved from <https://www.1000bulbs.com/pdf/led-ipar3843101d-specs.pdf> on Jan. 11, 2017, 2 pages.

Philips Lighting, "Philips Lighting unveils SceneSwitch—a unique LED light bulb range designed to make multi-purpose homes work harder", Jul. 12, 2016, 6 pages, retrieved from <http://www.newsroom.lighting.philips.com/news/2016/20160712-philips-lighting-unveils-sceneswitch-a-unique-led-light-bulb-range-designed-to-make-multi-purpose-homes-work-harder.html> on Jan. 11, 2017.

Unknown Author, "Rambus introduces LED BR30 and PAR30 with mechanically adjustable CCT—LEDs", *LEDs Magazine*, Jun. 12, 2013, 3 pages, retrieved from <http://www.ledsmagazine.com/articles/iif/2013/06/rambus-introduces-led-br30-and-par30-with-mechanically-adjustable-cct.html> on Jan. 11, 2017.

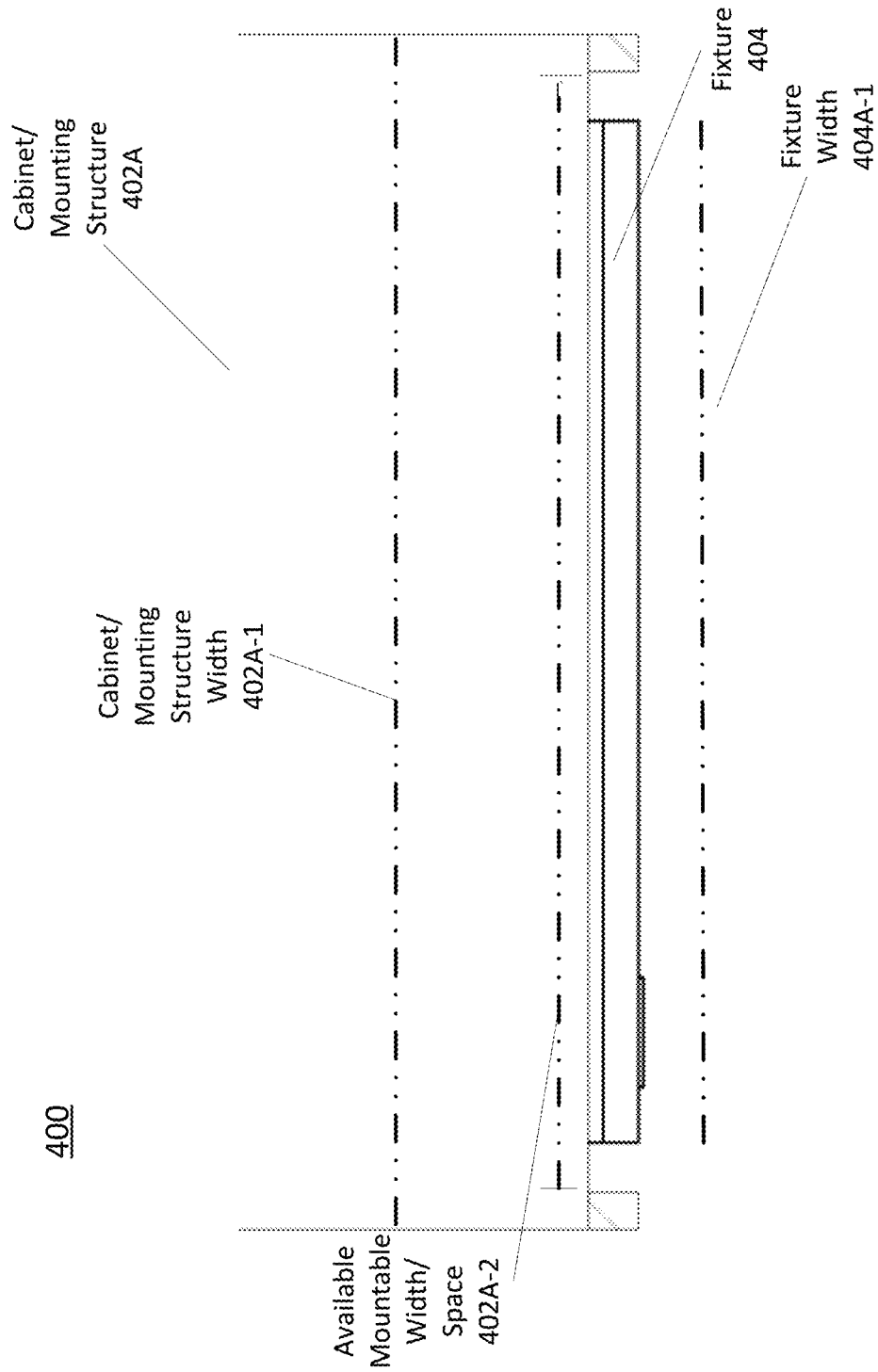

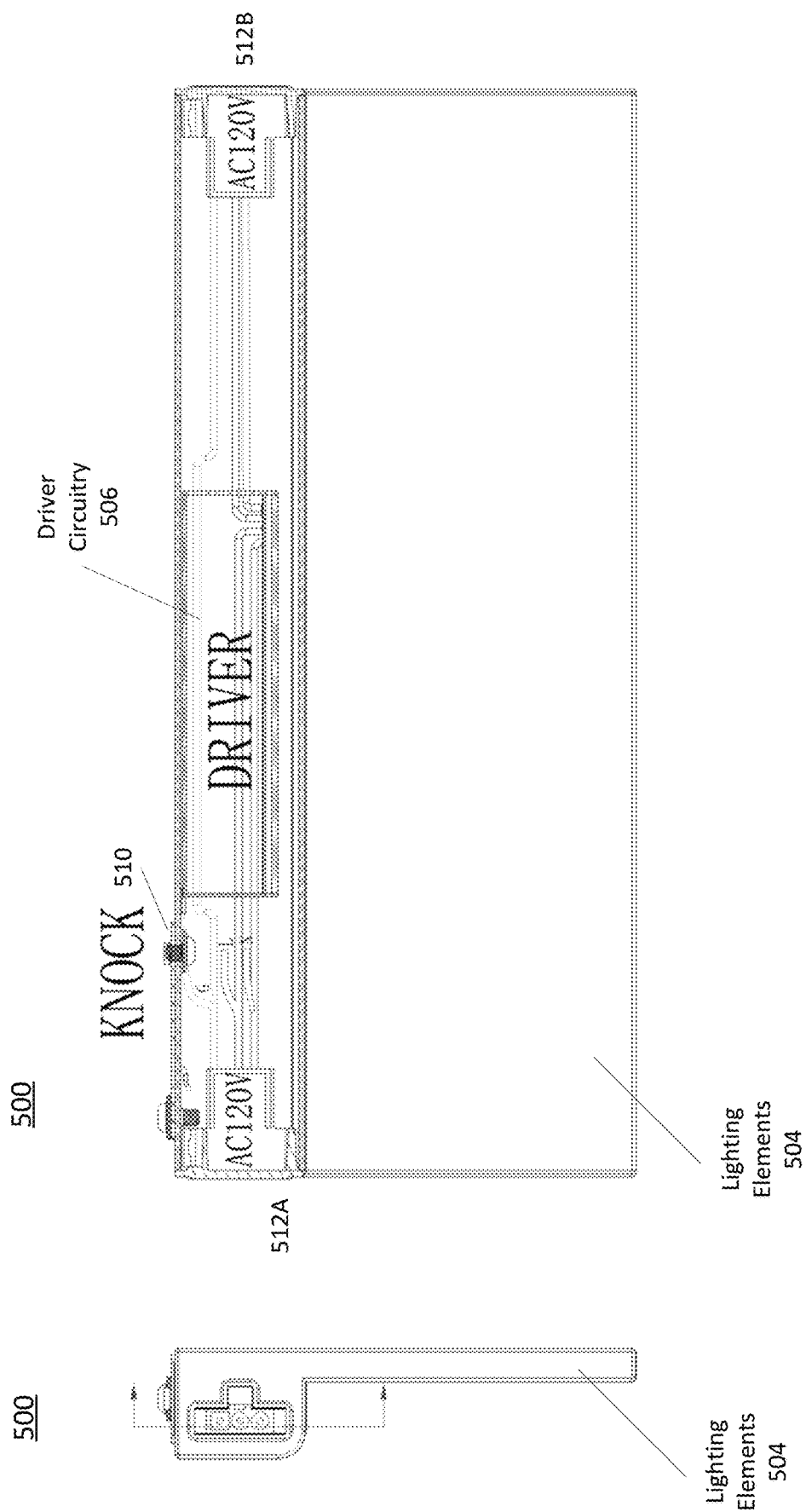

Wall Mount/
Removable Remote
Control/Computing
Device
902C

Actuatable
Power
Selection
913A

Actuatable
Dimming
Selection
913C

Actuatable
Color/
Parameter
Selection
913B

Wall Mount/
Removable Remote
Control/Computing
Device
902B

Actuatable
Power
Selection
903A

Actuatable
Color/
Parameter
Selection
903B

Actuatable
Dimming
Selection
903C

Wall Mount/
Removable Remote
Control/Computing
Device
902E

SYSTEMS AND APPARATUSES FOR CONFIGURABLE AND CONTROLLABLE UNDER CABINET LIGHTING FIXTURES

BACKGROUND

Conventional systems and apparatuses for use as under cabinet or under mounting surface lighting are limited in that they may require complex rewiring or attachment mechanisms in existing spaces, they do not communicate with one another, they are limited by conventional size restrictions dictated by the cabinet or mounting surfaces to which they may be affixed, and they do not enable additional functionalities or accessories.

Through applied effort, ingenuity, and innovation many deficiencies of such systems have been solved by developing solutions that are in accordance with the embodiments of the present disclosure, many examples of which are described in detail herein.

SUMMARY

Systems and apparatus for enabling controllable and configurable under cabinet lighting fixtures are provided. A configurable controllable under cabinet lighting fixture and system for controlling the same are provided. An example configurable controllable under cabinet lighting fixture includes one or more lighting elements positioned from a proximal end of a lighting fixture housing to a distal end of a lighting fixture housing. The example configurable controllable under cabinet lighting fixture further includes circuitry configured to control one or more first parameters associated with the one or more lighting elements. The circuitry is further configured to control one or more second parameters associated with one or more nearby configurable controllable under cabinet lighting fixtures located within a proximity threshold of the configurable controllable under cabinet lighting fixture. The lighting fixture housing is configured for affixing to a downward facing surface of a mounting surface.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by a second or third label that distinguishes among the similar components (e.g., 1A and 1B may refer to components of the same type). If only the first reference label is used in the specification, the description is applicable to any one of the similar components having the same first reference label irrespective of the second reference label. A brief description of the Figures is below.

FIG. 4A illustrates an example configurable controllable under cabinet lighting fixture according to various embodiments of the present disclosure.

FIG. 5B illustrates an example schematic of an example configurable controllable under cabinet lighting fixture according to various embodiments of the present disclosure.

FIG. 5C illustrates an example schematic of an example configurable controllable under cabinet lighting fixture according to various embodiments of the present disclosure.

DETAILED DESCRIPTION OF VARIOUS EMBODIMENTS

Figure 1A:
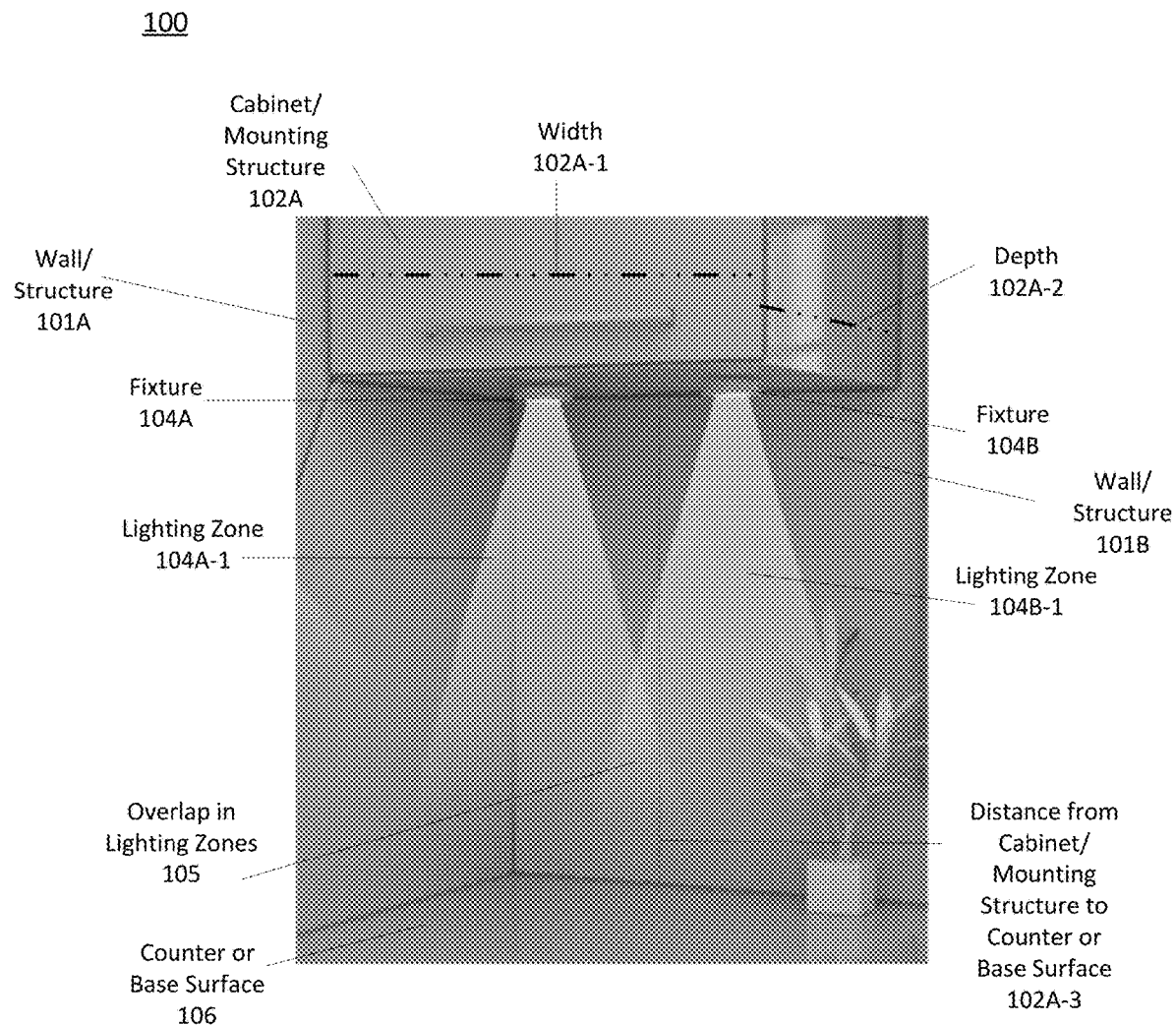
FIG. 1A illustrates an example configurable controllable under cabinet lighting fixture according to various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Embodiments herein enable easy installation and seamless control of multiple configurable controllable under cabinet lighting fixtures in a given physical structure or space.

In various embodiments, a configurable controllable under cabinet lighting fixture includes one or more lighting elements positioned from a proximal end of a lighting fixture housing to a distal end of a lighting fixture housing of the lighting fixture. The lighting fixture may further include circuitry configured to control one or more parameters associated with the one or more lighting elements. The circuitry may also be configured to control one or more parameters associated with one or more nearby configurable controllable under cabinet lighting fixtures located within a proximity threshold (e.g., 50 feet) of the configurable controllable under cabinet lighting fixture. In certain embodiments, the lighting fixture housing is configured for affixing to a downward facing surface of a mounting surface (e.g., a cabinet).

Illumination from the one or more lighting elements may travel away from the downward facing surface of the mounting surface.

Embodiments herein enable the use of configurable controllable under cabinet lighting fixtures that have widths (e.g., from a proximal end of the lighting fixture housing to a distal end of the lighting fixture housing) that are configured to fit within space constraints dictated by conventional mounting surface (e.g., cabinet) design. For example, a width of a configurable controllable under cabinet lighting fixture may be one of 9.5 inches or 20.5 inches. In certain embodiments, a width may be 14.5 inches for an 18 inch cabinet (e.g., 1125 lumens) and/or 32.5 inches for a 36 inch cabinet (e.g., 2100 lumens). In certain embodiments, such a width (e.g., of the configurable controllable under cabinet lighting fixture) may be less than a width of the mounting surface (e.g., cabinet) to which the lighting fixture will be affixed.

Embodiments herein also enable maintaining a consistent ratio of lumens per mounting surface measurement unit across multiple configurable controllable under cabinet lighting fixtures of different sized because the lumens of each configurable controllable under cabinet lighting fixture are adjusted according to a mounting surface width (e.g., as opposed to a width of the configurable controllable under cabinet lighting fixture). For example, a ratio of lumens per mounting surface measurement unit for a plurality of configurable controllable under cabinet lighting fixtures may be 62.5 lumens per inch.

Embodiments herein relate to a configurable controllable under cabinet lighting fixture that may be associated with a given lighting zone of multiple lighting zones in a given physical space. In such embodiments, nearby configurable controllable under cabinet lighting fixture may be associated with a unique lighting zone of the multiple lighting zones. Further, the multiple lighting zones may overlap.

A configurable controllable under cabinet lighting fixture may be associated with a lighting zone that is downward extending from a housing of the lighting fixture.

Embodiments herein enable control of a configurable controllable under cabinet lighting fixture whereby circuitry of the fixture is responsive to signals received from a remote computing device, direct or wall mounted switch circuitry, a voice activated computing device, motion sensing devices, and more.

Embodiments herein may include edge lit lighting elements and/or back lit lighting elements.

Example configurable controllable under cabinet lighting fixtures herein may include circuitry having a ground wire for configuring the circuitry to supply power to one or more grounded power outlet accessories affixed to the downward facing surface of the mounting surface. In such embodiments, the circuitry is configured such that power is continuously supplied to the one or more grounded power outlet accessories when power is discontinued to the one or more lighting elements. In such embodiments, the circuitry may further include one or more AC power connections usable as power source connections or power supply connections.

In embodiments herein, configurable controllable under cabinet lighting fixture comprise one or more of bar lighting elements, rope lighting elements, tape lighting elements, or puck lighting elements.

In certain embodiments, the lighting elements of the configurable controllable under cabinet lighting fixtures are customizable according to a variety of parameters, including, for example, color, color temperature, color rendering index (CRI), direction, dim level, voltage, or other controllable parameter. Customizable operating and control of each lighting element may be associated with various configurable light qualities (e.g., also referred to herein as parameters). Examples of such configurability and more are described in co-pending U.S. patent application Ser. No. 16/001,260, titled "Light Emitting Diode (LED) Lighting Device Or Lamp With Configurable Light Qualities," filed Jun. 6, 2018, as well as U.S. patent application Ser. No. 15/274,575, titled "Light Emitting Diode (LED) Lighting Device Or Lamp With Configurable Light Qualities," filed Sep. 23, 2016, now U.S. Pat. No. 9,801,250, the entire contents of both of which are incorporated herein by reference. It will be appreciated that the lighting elements of the configurable controllable under cabinet lighting fixtures described herein may be controlled or operated by way of a physical switch attached to or situated on the configurable controllable under cabinet lighting fixtures. It will be further appreciated that the lighting elements of the configurable controllable under cabinet lighting fixtures described herein may be controlled or operated by way of a wall switch communicably and/or electrically coupled with the configurable controllable under cabinet lighting fixtures as described below with respect to the example embodiments of control circuitry.

In certain embodiments, any combination of types of lighting elements may be employed in a configurable controllable under cabinet lighting fixture. That is, lighting elements comprising light emitting diode (LED) devices, fluorescent devices, incandescent devices, or halogen devices, may be used in the configurable controllable under cabinet lighting fixture without limitation.

FIG. 1A illustrates example configurable controllable under cabinet lighting fixtures according to various embodiments of the present disclosure. In FIG. 1A, an example system 100 including multiple configurable controllable under cabinet lighting fixtures includes a first wall/structure 101A and a second wall/structure 101 to which a cabinet/mounting structure 102A may be affixed or mounted. The cabinet/mounting structure 102A may be characterized by or associated with a width 102A-1 and a depth 102A-2, which may dictate an available amount of space for affixing or mounting one or more configurable controllable under cabinet lighting fixtures (e.g., 104A, 104B) to a downward or other facing surface of the cabinet/mounting structure 102A. The cabinet/mounting structure 102A may also be associated with or positioned according to a distance from or above 102A-3 a counter or base surface 106. That is, the cabinet/mounting structure 102A may be affixed to the wall/structure(s) 101A, 101B such that there is a distance 102A-3 between a bottom surface of the cabinet/mounting structure 102A and a counter or base surface 106 below the cabinet/mounting structure 102A.

Further, each of the configurable controllable under cabinet lighting fixtures 104A, 104B, may be associated with a unique lighting zone (e.g., 104A-1, 104B-1). That is, configurable controllable under cabinet lighting fixture 104A may be associated with a first lighting zone 104A-1 such that illumination originating from configurable controllable under cabinet lighting fixture 104A follows a pathway associated with the first lighting zone 104A-1. Similarly, configurable controllable under cabinet lighting fixture 104B may be associated with a second lighting zone 104B-1 such that illumination originating from configurable controllable under cabinet lighting fixture 104B follows a pathway associated with the second lighting zone 104B-1. It will be appreciated that, like shown in FIG. 1A, there may be overlap 105 between the first lighting zone 104A-1 and second lighting zone 104B-1 such that illumination originating from both fixtures 104A, 104B exists along a certain path. Control circuitry (not shown) associated with each of the fixtures 104A, 104B may be configured to respond to signals provided by way of a control device (not shown in FIG. 1A) to adjust or program the lighting zones 104A-1, 104B-1, and/or any other parameters associated with either of the fixtures 104A, 104B, as is discussed herein.

Figure 1B:
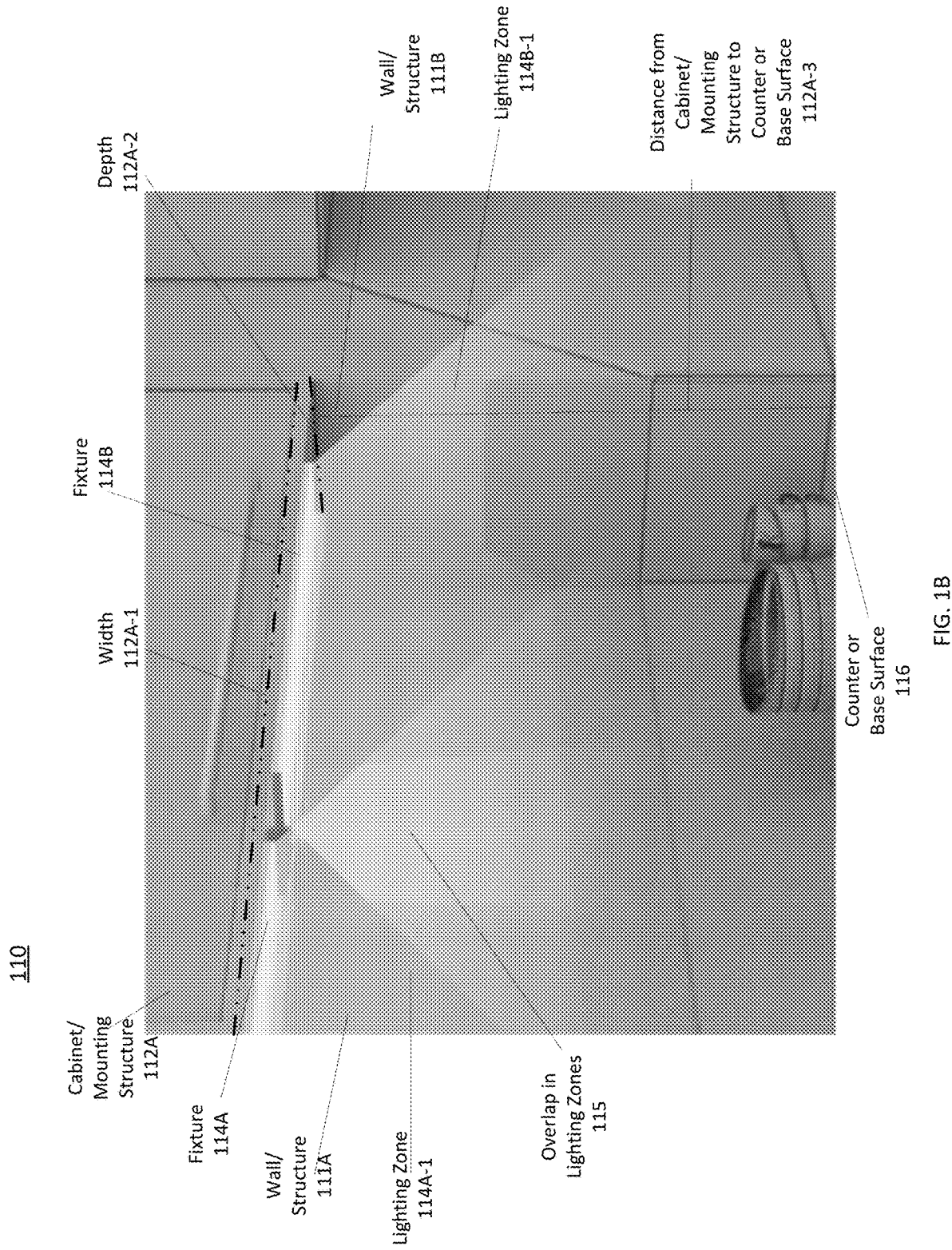
FIG. 1B illustrates an example configurable controllable under cabinet lighting fixture according to various embodiments of the present disclosure.

FIG. 1B illustrates example configurable controllable under cabinet lighting fixtures according to various embodiments of the present disclosure. In FIG. 1B, an example system 110 including multiple configurable controllable under cabinet lighting fixtures includes a first wall/structure 111A and a second wall/structure 111B to which a cabinet/mounting structure 112A may be affixed or mounted. The cabinet/mounting structure 112A may be characterized by or associated with a width 112A-1 and a depth 112A-2, which may dictate an available amount of space for affixing or mounting one or more configurable controllable under cabinet lighting fixtures (e.g., 114A, 114B) to a downward or other facing surface of the cabinet/mounting structure 112A. The cabinet/mounting structure 112A may also be associated with or positioned according to a distance from or above 112A-3 a counter or base surface 116. That is, the cabinet/mounting structure 112A may be affixed to the wall/structure(s) 111A, 111B such that there is a distance 112A-3 between a bottom surface of the cabinet/mounting structure 112A and a counter or base surface 116 below the cabinet/mounting structure 112A.

Further, each of the configurable controllable under cabinet lighting fixtures 114A, 114B, may be associated with a unique lighting zone (e.g., 114A-1, 114B-1). That is, configurable controllable under cabinet lighting fixture 114A may be associated with a first lighting zone 114A-1 such that illumination originating from configurable controllable under cabinet lighting fixture 114A follows a pathway associated with the first lighting zone 114A-1. Similarly, configurable controllable under cabinet lighting fixture 114B may be associated with a second lighting zone 114B-1 such that illumination originating from configurable controllable under cabinet lighting fixture 114B follows a pathway associated with the second lighting zone 114B-1. It will be appreciated that, like shown in FIG. 1n, there may be overlap 115 between the first lighting zone 114A-1 and second lighting zone 114B-1 such that illumination originating from both fixtures 114A, 114B exists along a certain path. Control circuitry (not shown) associated with each of the fixtures 114A, 114B may be configured to respond to signals provided by way of a control device (not shown in FIG. 1B) to adjust or program the lighting zones 114A-1, 114B-1, and/or any other parameters associated with either of the fixtures 114A, 114B, as is discussed herein.

Figure 1C:
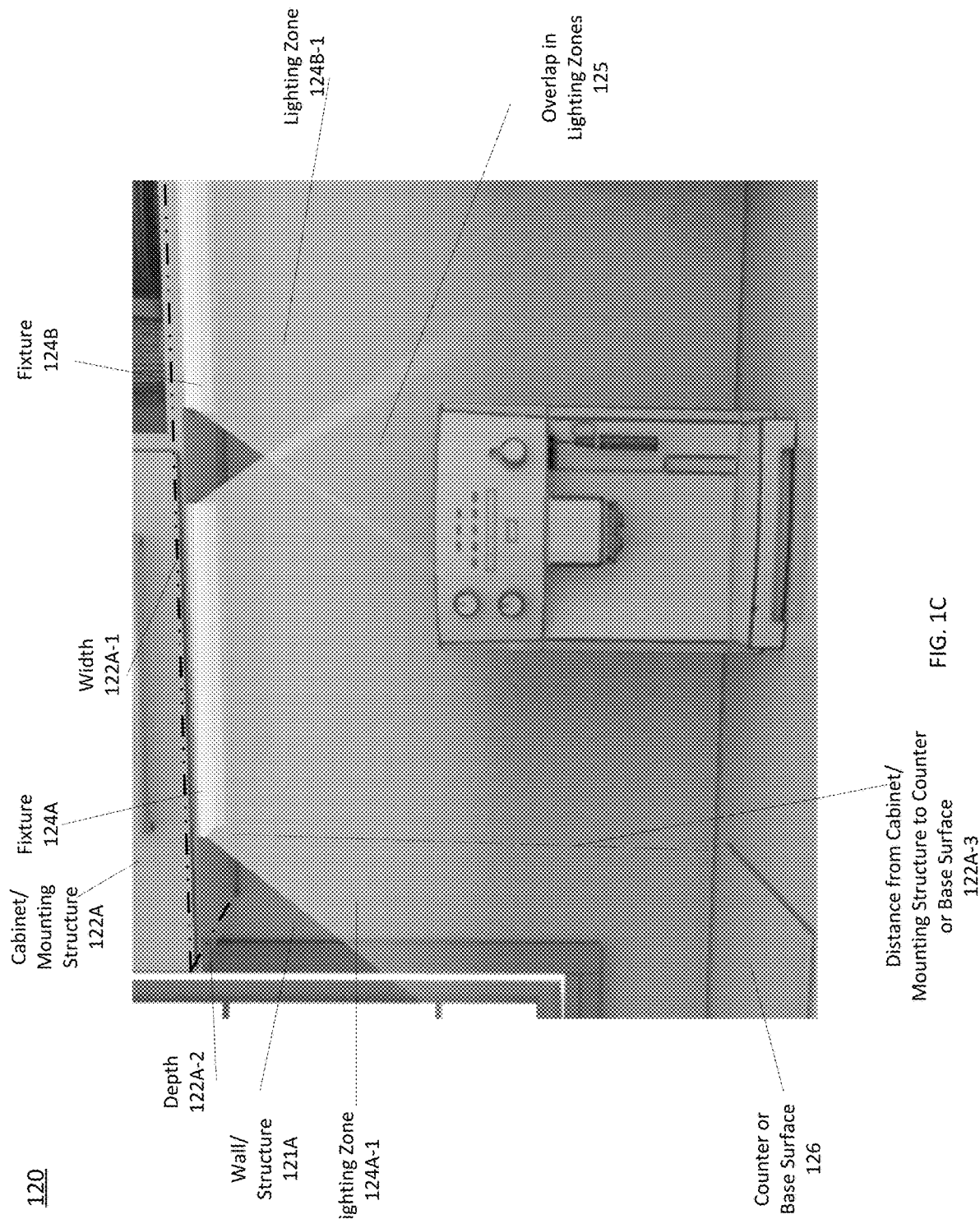
FIG. 1C illustrates an example configurable controllable under cabinet lighting fixture according to various embodiments of the present disclosure.

FIG. 1C illustrates example configurable controllable under cabinet lighting fixtures according to various embodiments of the present disclosure. In FIG. 1C, an example system 120 including multiple configurable controllable under cabinet lighting fixtures includes a first wall/structure 121A and optionally a second wall/structure (not shown) to which a cabinet/mounting structure 122A may be affixed or mounted. The cabinet/mounting structure 122A may be characterized by or associated with a width 122A-1 and a depth 122A-2, which may dictate an available amount of space for affixing or mounting one or more configurable controllable under cabinet lighting fixtures (e.g., 124A, 124B) to a downward or other facing surface of the cabinet/mounting structure 122A. The cabinet/mounting structure 122A may also be associated with or positioned according to a distance from or above 122A-3 a counter or base surface 126. That is, the cabinet/mounting structure 122A may be affixed to the wall/structure(s) 121A such that there is a distance 122A-3 between a bottom surface of the cabinet/mounting structure 102A and a counter or base surface 126 below the cabinet/mounting structure 122A.

Further, each of the configurable controllable under cabinet lighting fixtures 124A, 124B, may be associated with a unique lighting zone (e.g., 124A-1, 124B-1). That is, configurable controllable under cabinet lighting fixture 124A may be associated with a first lighting zone 124A-1 such that illumination originating from configurable controllable under cabinet lighting fixture 124A follows a pathway associated with the first lighting zone 124A-1. Similarly, configurable controllable under cabinet lighting fixture 104B may be associated with a second lighting zone 124B-1 such that illumination originating from configurable controllable under cabinet lighting fixture 124B follows a pathway associated with the second lighting zone 124B-1. It will be appreciated that, like shown in FIG. 1C, there may be overlap 125 between the first lighting zone 124A-1 and second lighting zone 124B-1 such that illumination originating from both fixtures 124A, 124B exists along a certain path. Control circuitry (not shown) associated with each of the fixtures 124A, 124B may be configured to respond to signals provided by way of a control device (not shown in FIG. 1C) to adjust or program the lighting zones 124A-1, 124B-1, and/or any other parameters associated with either of the fixtures 124A, 124B, as is discussed herein.

Figure 1D:
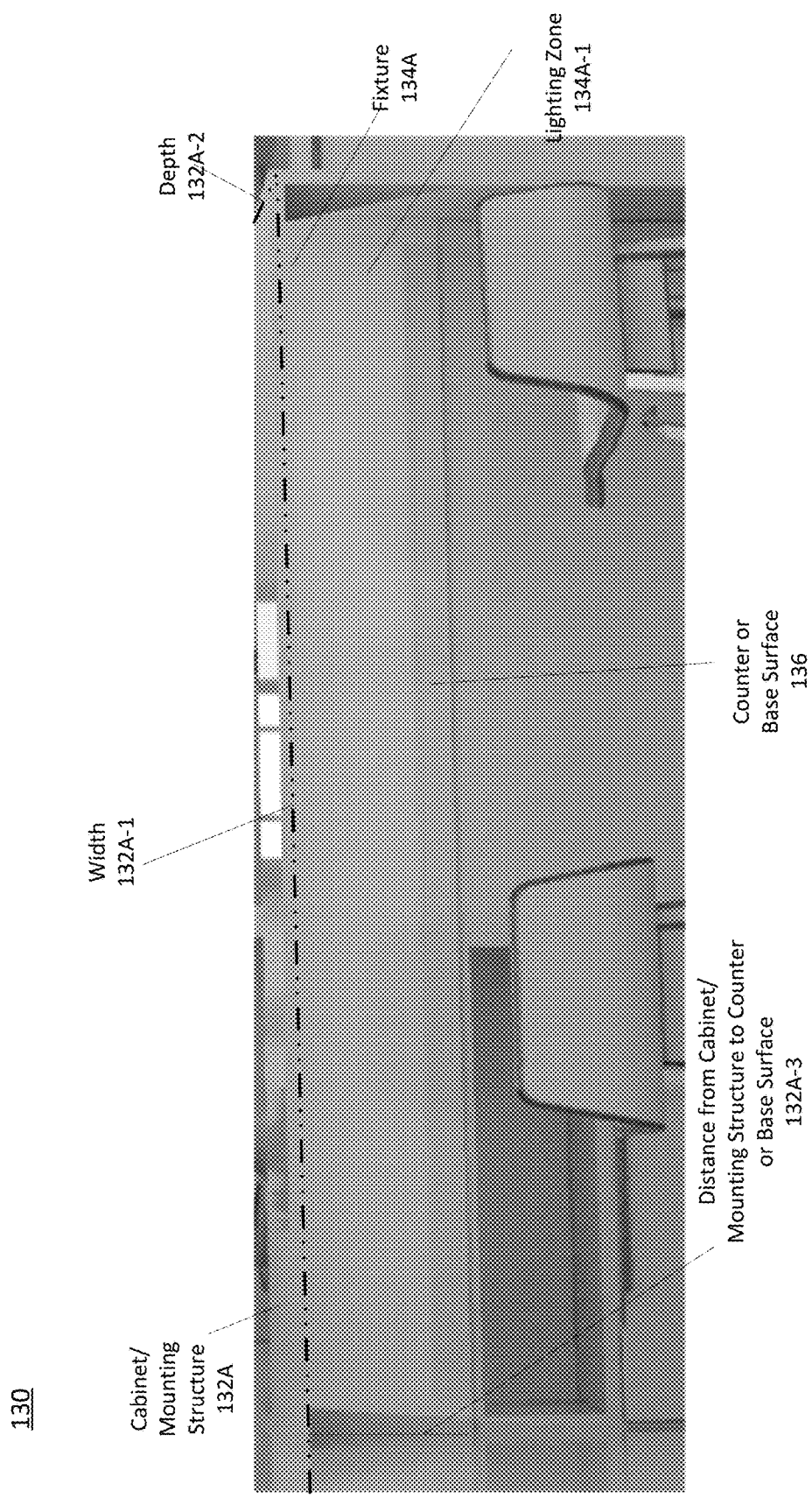
FIG. 1D illustrates an example configurable controllable under cabinet lighting fixture according to various embodiments of the present disclosure.

FIG. 1D illustrates an example configurable controllable under cabinet lighting fixture according to various embodiments of the present disclosure. In FIG. 1D, an example system 130 including a configurable controllable under cabinet lighting fixture includes a free-standing or otherwise mounted cabinet/mounting structure 132A. The cabinet/mounting structure 132A may be characterized by or associated with a width 132A-1 and a depth 132A-2, which may dictate an available amount of space for affixing or mounting one or more configurable controllable under cabinet lighting fixtures (e.g., 134A) to an inner/downward or other facing surface of the cabinet/mounting structure 132A. The cabinet/mounting structure 132A may also be associated with or positioned according to a distance from or above 132A-3 a counter or base surface 136. That is, the cabinet/mounting structure 132A may have an opening therein such that there is a distance 132A-3 between an inner/bottom surface of the cabinet/mounting structure 132A and a counter or base surface 136 below the cabinet/mounting structure 132A.

Further, the configurable controllable under cabinet lighting fixture 134A may be associated with a unique lighting zone (e.g., 134A-1). That is, configurable controllable under cabinet lighting fixture 134A may be associated with a lighting zone 134A-1 such that illumination originating from configurable controllable under cabinet lighting fixture 134A follows a pathway associated with the lighting zone 134A-1. Control circuitry (not shown) associated with the fixture 134A may be configured to respond to signals provided by way of a control device (not shown in FIG. 1D) to adjust or program the lighting zone 134A-1 and/or any other parameters associated with the fixture 134A as is discussed herein.

Figure 2A:
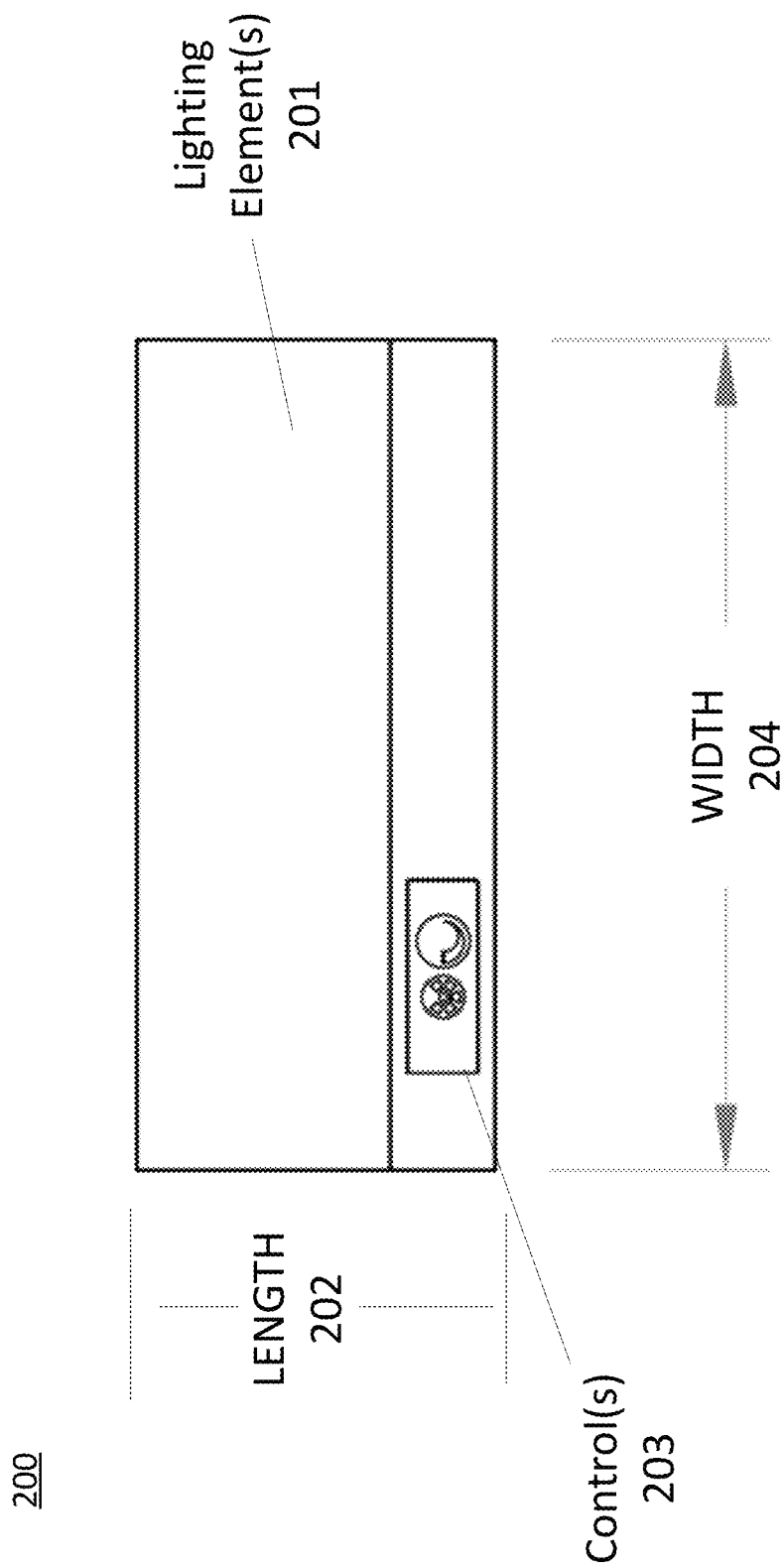
FIG. 2A illustrates an example configurable controllable under cabinet lighting fixture according to various embodiments of the present disclosure.

FIG. 2A illustrates an example configurable controllable under cabinet lighting fixture 200 according to various embodiments of the present disclosure. In FIG. 2A, an example configurable controllable under cabinet lighting fixture 200 includes one or more lighting elements 201 (e.g., LEDs or other light emitting elements/devices) and controls 203. The example configurable controllable under cabinet lighting fixture 200 has associated therewith a length (e.g., or depth) 202 and a width (e.g., 9.5 inches in certain embodiments). Controls 203 may be configured to control power to (e.g., on or off) the example configurable controllable under cabinet lighting fixture 200 as well as step dimming, correlated color temperature (CCT) levels (e.g., in certain embodiments multiple levels, or five levels), night light settings, and more.

It will be appreciated that embodiments of the present disclosure have lumens that are adjusted to maintain a consistent lumen per measurement of width (e.g., inch) based on the width of a cabinet or mounting structure to which the configurable controllable under cabinet lighting fixture may be affixed or attached. This is in contrast to and an improvement over existing solutions that base consistency of lumen per measurement of length on a width of the actual under cabinet lighting fixture. For example, an example configurable controllable under cabinet lighting fixture may have associated therewith a width of 9.5 inches a cabinet width of 12 inches and lumens of 750 lumens. This results in a 62.5 lumens/inch for the cabinet size and but a 79 lumens/inch based on lighting fixture size. By way of further example, an example configurable controllable under cabinet lighting fixture may have associated therewith a width of 20.5 inches, a cabinet width of 24 inches, and lumens of 1150 lumens. This results in a 48 lumens/inch cabinet size and a 56 lumens/inch lighting fixture size. From these examples, it will be appreciated that the embodiments herein may have levels of lumens that are adjusted according to the width of a cabinet or mounting structure in order to maintain a consistently available ratio of lumens per measurement of width. By way of further example, a level of lumens may be calculated in relation to the width cabinet or mounting structure or, alternatively, in relation to a total surface area of the cabinet or mounting structure.

Figure 2B:
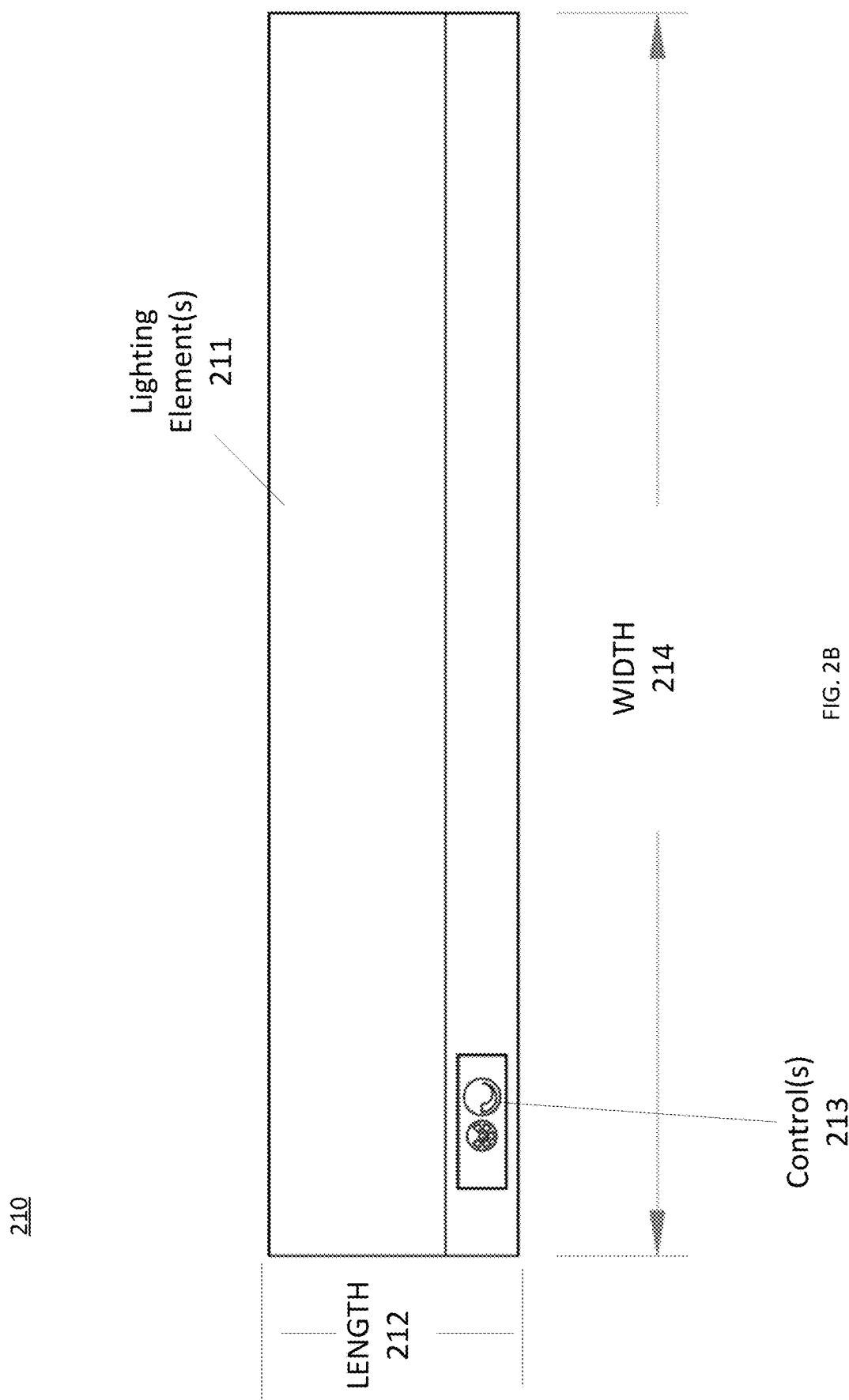
FIG. 2B illustrates an example configurable controllable under cabinet lighting fixture according to various embodiments of the present disclosure.

FIG. 2B illustrates an example configurable controllable under cabinet lighting fixture 210 according to various embodiments of the present disclosure. In FIG. 2B, an example configurable controllable under cabinet lighting fixture 210 includes one or more lighting elements 211 (e.g., LEDs or other light emitting elements/devices) and controls 213. The example configurable controllable under cabinet lighting fixture 210 has associated therewith a length (e.g., or depth) 202 and a width (e.g., 20.5 inches in certain embodiments). Controls 213 may be configured to control power to (e.g., on or off) the example configurable controllable under cabinet lighting fixture 210 as well as step dimming, correlated color temperature (CCT) levels (e.g., in certain embodiments multiple levels, or five levels), night light settings, and more.

Figure 3A:
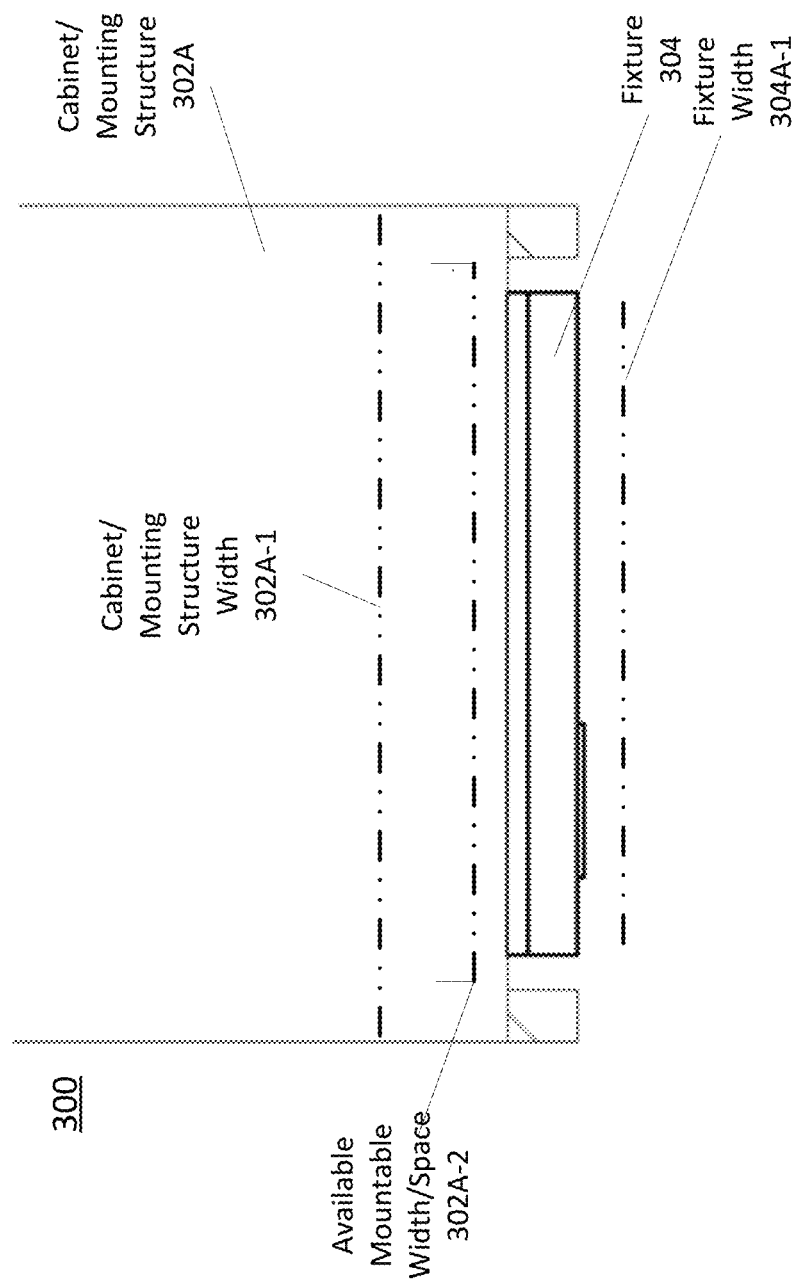
FIG. 3A illustrates an example configurable controllable under cabinet lighting fixture according to various embodiments of the present disclosure.
Figure 3B:
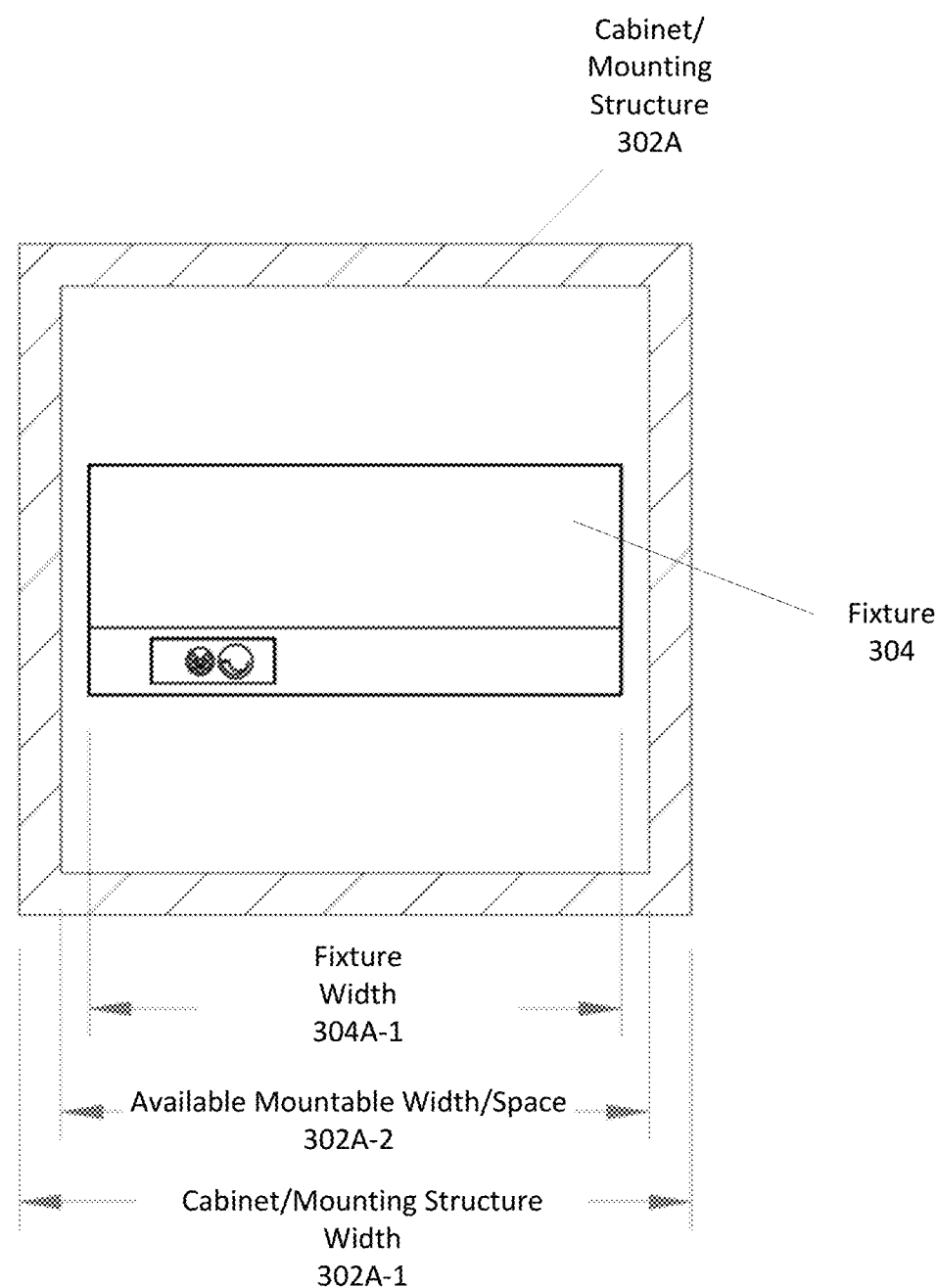
FIG. 3B illustrates an example configurable controllable under cabinet lighting fixture according to various embodiments of the present disclosure.

FIGS. 3A and 3B illustrate an example configurable controllable under cabinet lighting fixture system 300 according to various embodiments of the present disclosure. In FIG. 3A, a front facing view illustrates an example configurable controllable under cabinet lighting fixture 304, having a width 304A-1, positioned (e.g., attached or affixed to) underneath (e.g., to a downward facing surface of) a cabinet or mounting structure 302A. The cabinet or mounting structure 302A is associated with a width 302A-1, and an amount of mountable width or space 302A-2 may be made available according to various design parameters of the cabinet or mounting structure 302A. For example, the amount of mountable width or space 302A-2, within which an example configurable controllable under cabinet lighting fixture 304 may be positioned, may have a shorter width as compared to the full width 302A-1 of the cabinet or mounting structure 302A. Accordingly, example configurable controllable under cabinet lighting fixtures 304 may have widths 304A-1 that are configured or configurable according to an amount of available mountable width or space 302A-2 that is not identical to a standard or conventional width 302A-1 of the cabinet or mounting structure 302A.

In FIG. 3B, an upward view (e.g., a worm's or ant's eye view) illustrates an example configurable controllable under cabinet lighting fixture 304, having a width 304A-1 (e.g., 9.5 inches), positioned (e.g., attached or affixed to) underneath (e.g., to a downward facing surface of) a cabinet or mounting structure 302A. The cabinet or mounting structure 302A is associated with a width 302A-1 (e.g., 12 inches), and an amount of mountable width or space 302A-2 (e.g., 10.5 inches) may be made available according to various design parameters of the cabinet or mounting structure 302A.

Figure 4B:
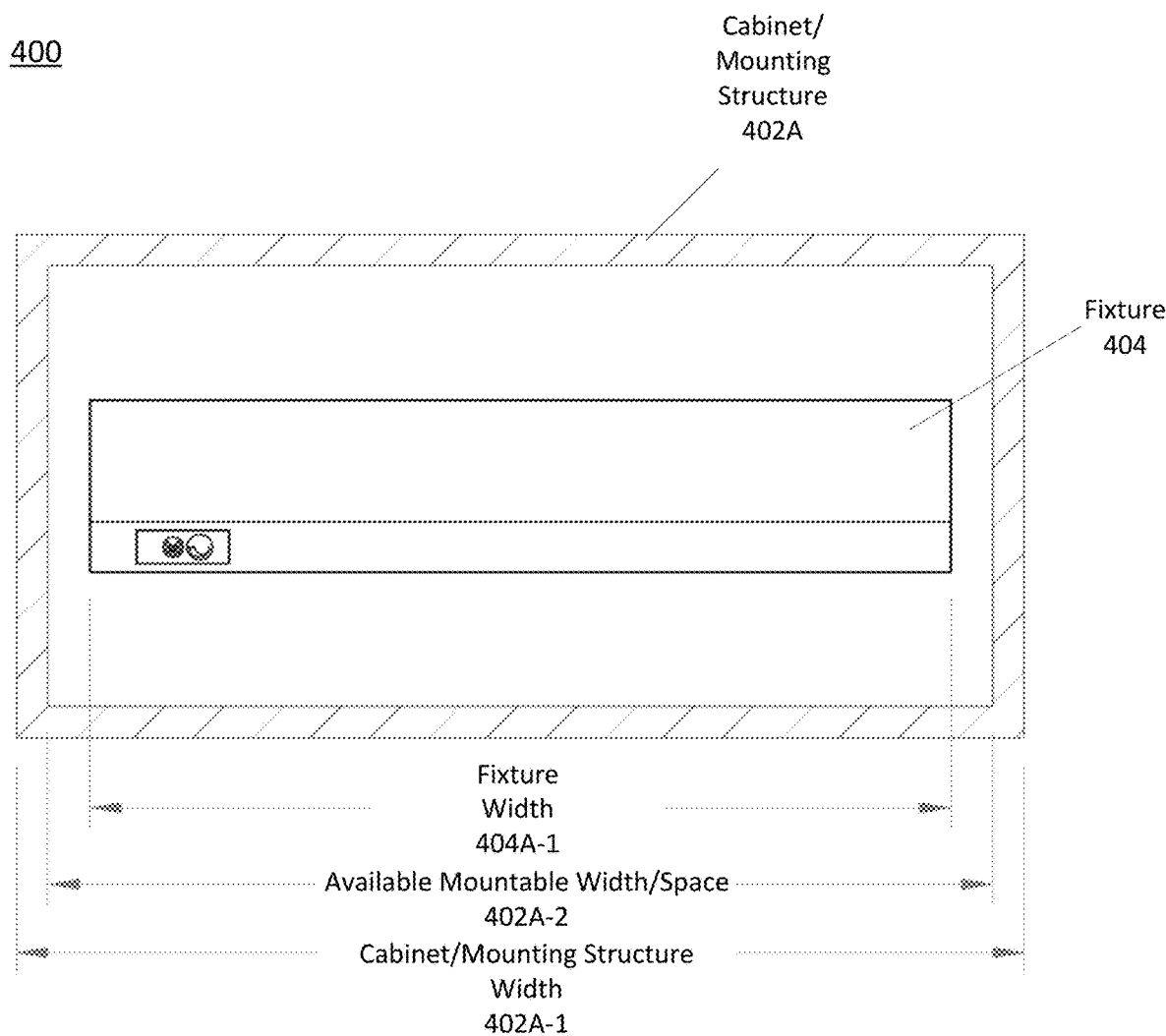
FIG. 4B illustrates an example configurable controllable under cabinet lighting fixture according to various embodiments of the present disclosure.

FIGS. 4A and 4B illustrate an example configurable controllable under cabinet lighting fixture system 400 according to various embodiments of the present disclosure. In FIG. 4A, a front facing view illustrates an example configurable controllable under cabinet lighting fixture 404, having a width 404A-1, positioned (e.g., attached or affixed to) underneath (e.g., to a downward facing surface of) a cabinet or mounting structure 402A. The cabinet or mounting structure 402A is associated with a width 402A-1, and an amount of mountable width or space 402A-2 may be made available according to various design parameters of the cabinet or mounting structure 402A. For example, the amount of mountable width or space 402A-2, within which an example configurable controllable under cabinet lighting fixture 404 may be positioned, may have a shorter width as compared to the full width 402A-1 of the cabinet or mounting structure 402A. Accordingly, example configurable controllable under cabinet lighting fixtures 404 may have widths 404A-1 that are configured or configurable according to an amount of available mountable width or space 402A-2 that is not identical to a standard or conventional width 402A-1 of the cabinet or mounting structure 402A.

In FIG. 4B, an upward view (e.g., a worm's or ant's eye view) illustrates an example configurable controllable under cabinet lighting fixture 404, having a width 404A-1 (e.g., 20.5 inches), positioned (e.g., attached or affixed to) underneath (e.g., to a downward facing surface of) a cabinet or mounting structure 402A. The cabinet or mounting structure 402A is associated with a width 402A-1 (e.g., 24 inches), and an amount of mountable width or space 402A-2 (e.g., 22.55 inches) may be made available according to various design parameters of the cabinet or mounting structure 402A.

Figure 5A:
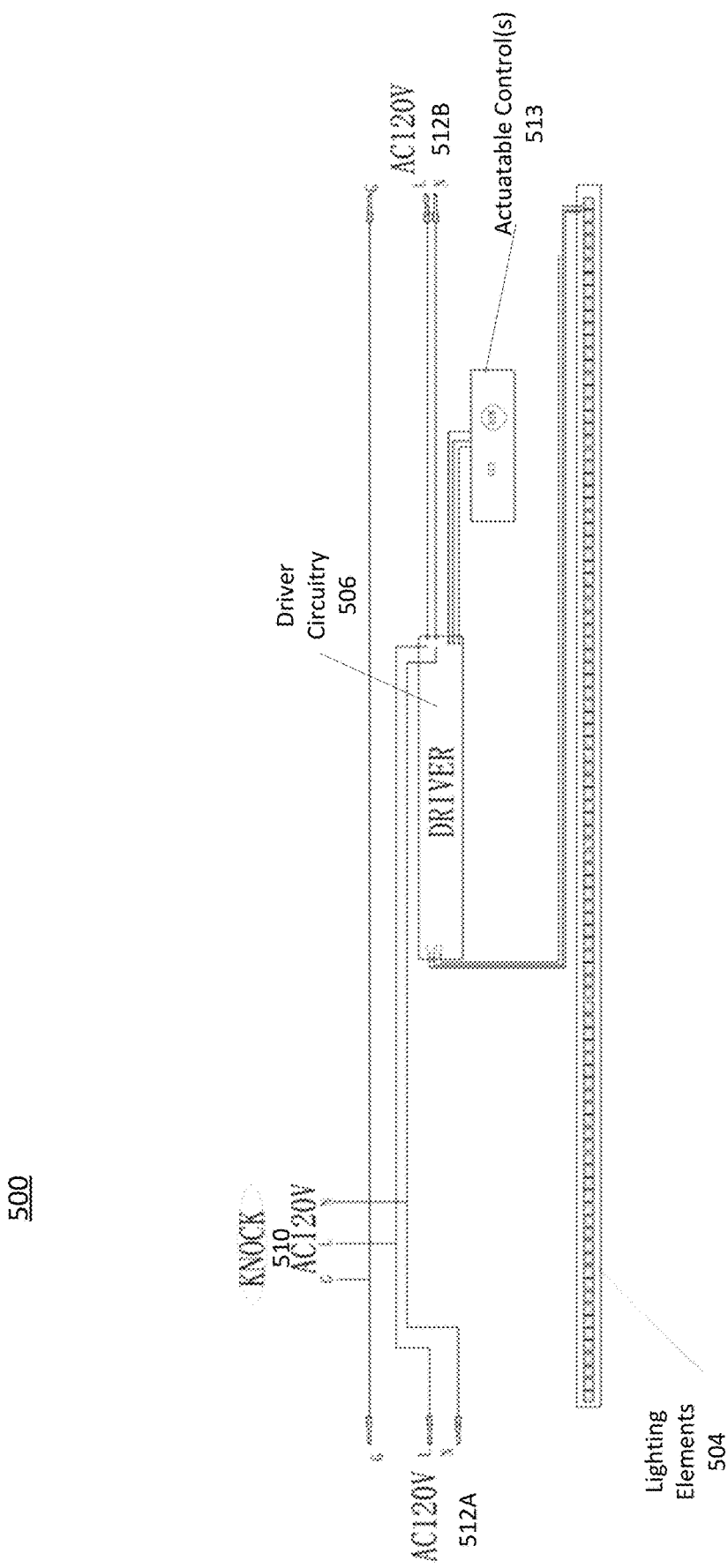
FIG. 5A illustrates an example schematic of an example configurable controllable under cabinet lighting fixture according to various embodiments of the present disclosure.

FIG. 5A illustrates an example schematic of an example configurable controllable under cabinet lighting fixture 500 according to various embodiments of the present disclosure. In FIG. 5A, an example configurable controllable under cabinet lighting fixture 500 includes driver circuitry 506 for controlling operability of multiple lighting elements 504, and responsive to optionally actuatable controls 513 positioned on the configurable controllable under cabinet lighting fixture 500. That is, the driver circuitry 506 may be configured to respond to control signals from the actuatable controls 513 positioned on the configurable controllable under cabinet lighting fixture 500 and/or control signals received from one or more control devices configured for providing control signals to the driver circuitry 506. The driver circuitry 506 is configurable to receive (e.g., and/or provide to another connected device) power by way of one or more A/C sources (e.g., 512A, 512B). Further, the example configurable controllable under cabinet lighting fixture 500 is configured to include a knock 510 for enabling hard wiring the configurable controllable under cabinet lighting fixture 500 to wiring associated with a structure within which the configurable controllable under cabinet lighting fixture 500 is to be situated.

FIGS. 5B and 5C illustrate an example schematic of an example configurable controllable under cabinet lighting fixture according to various embodiments of the present disclosure. FIG. 5B illustrates a side view of an example configurable controllable under cabinet lighting fixture 500, including one or more lighting elements 504. It will be appreciated that, while FIG. 5B is not necessarily drawn to scale, the side view illustrates that embodiments herein are directed to a low profile configurable controllable under cabinet lighting fixture 500. For example, an example profile (e.g., length or distance of protrusion from a mounting cabinet or structure) of an example configurable controllable under cabinet lighting fixture 500 may be approximately one (1) inch at a housing of the driver circuitry 506 and/or 0.3 inches at the one or more lighting elements 504.

Figure 6:
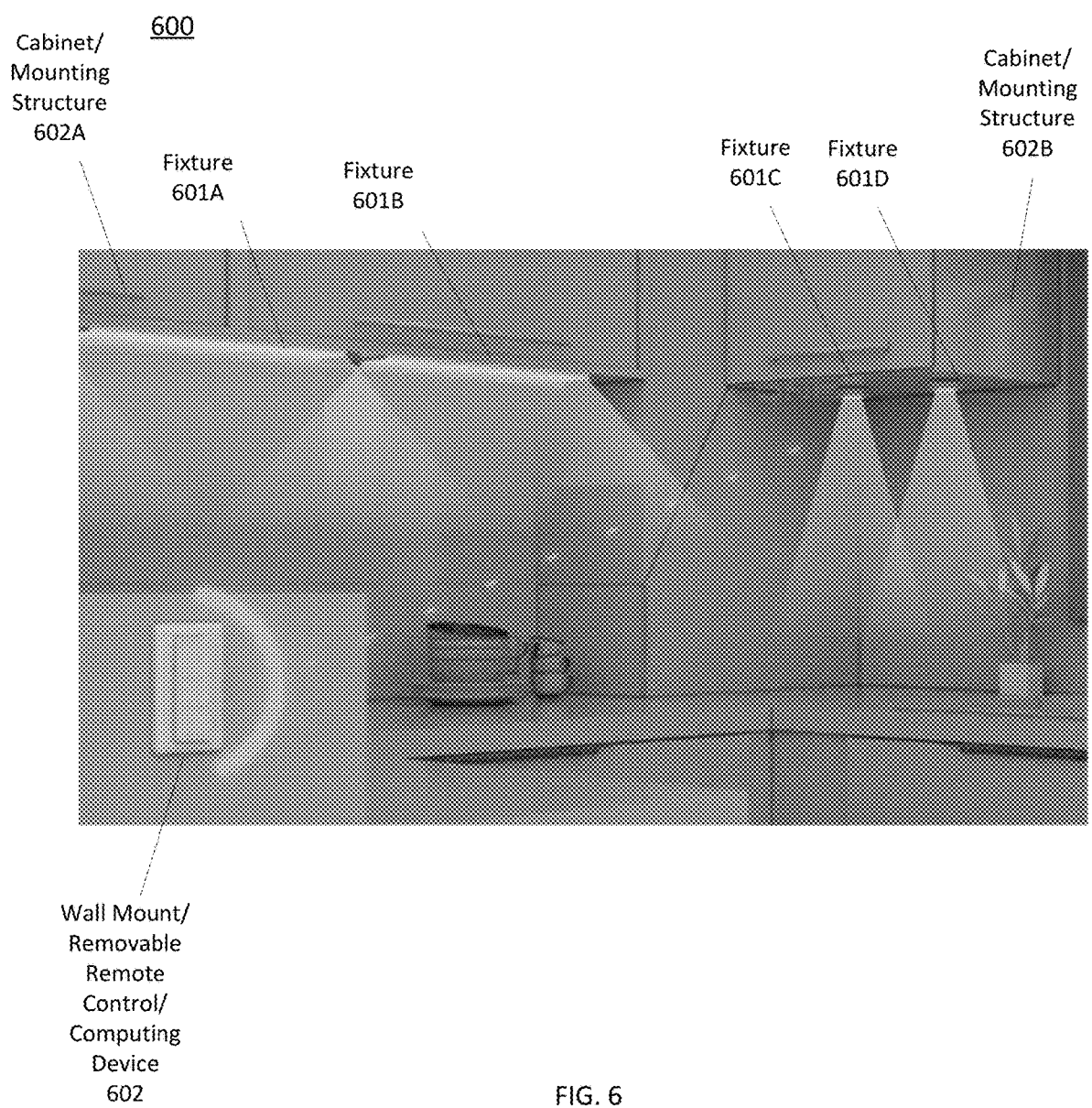
FIG. 6 illustrates an example system architecture including multiple example configurable controllable under cabinet lighting fixtures according to various embodiments of the present disclosure.

FIG. 6 illustrates an example system architecture including multiple example configurable controllable under cabinet lighting fixtures according to various embodiments of the present disclosure. In FIG. 6, a wall mount/removable remote control/computing device 602 is in communication (e.g., wirelessly) with multiple controllable configurable under cabinet lighting fixtures 601A, 601B, 601C, 601D. The wall mount/removable remote control/computing device 602 may wirelessly control operability and other operating parameters of each of the multiple controllable configurable under cabinet lighting fixtures 601A, 601B, 601C, 601D simultaneously and/or independently and according to manual input or programmed preferences (e.g., either pre-programmed or programmed according to user preferences). It will be appreciated that the controllable configurable under cabinet lighting fixtures 601A, 601B, 601C, 601D are controllable by way of the wall mount/removable remote control/computing device 602 and/or one another based on pairings of the lighting fixtures, and despite being affixed or mounted to different cabinet/mounting structures 602A, 602B. That is, fixture 601A and 601B are affixed or mounted to a different cabinet/mounting structure (e.g., 602A) than fixtures 601C, 601D (e.g., 602B) and there is distance between the fixtures that is immaterial to ability of the wall mount/removable remote control/computing device 602 and/or one or more of the other fixtures to control or configure any of the fixtures.

Figure 7:
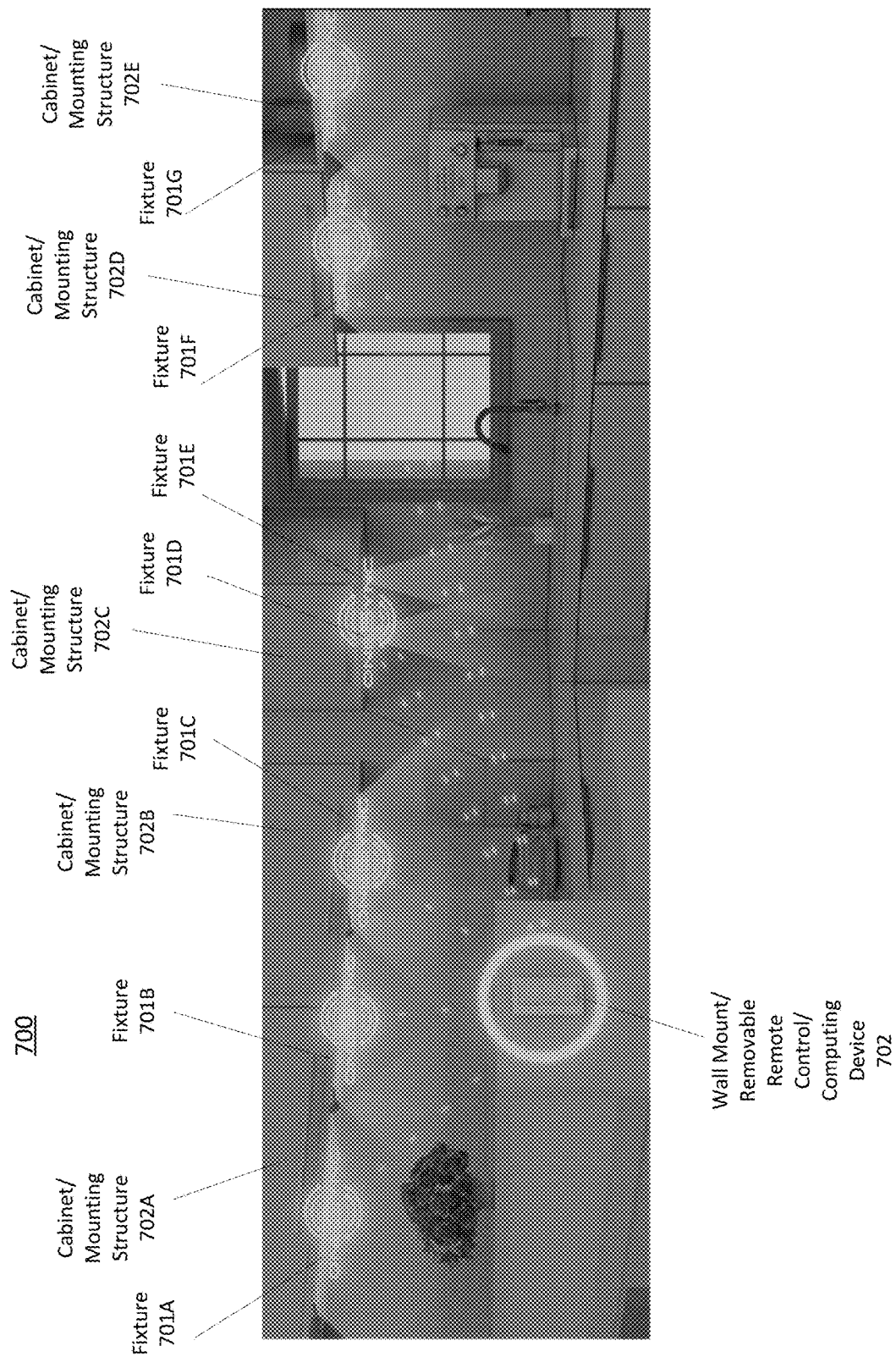
FIG. 7 illustrates an example system architecture including multiple example configurable controllable under cabinet lighting fixtures according to various embodiments of the present disclosure.

FIG. 7 illustrates an example system architecture including multiple example configurable controllable under cabinet lighting fixtures according to various embodiments of the present disclosure. In FIG. 7, a wall mount/removable remote control/computing device 702 is in communication (e.g., wirelessly) with multiple controllable configurable under cabinet lighting fixtures 701A, 701B, 701C, 701D, 701E, 701F, and 701G. The wall mount/removable remote control/computing device 702 may wirelessly control operability and other operating parameters of each of the multiple controllable configurable under cabinet lighting fixtures 701A, 701B, 701C, 701D, 701E, 701F, and 701G simultaneously and/or independently and according to manual input or programmed preferences (e.g., either pre-programmed or programmed according to user preferences). It will be appreciated that the controllable configurable under cabinet lighting fixtures 701A, 701B, 701C, 701D, 701E, 701F, and 701G are controllable by way of the wall mount/removable remote control/computing device 702 and/or one another based on pairings of the lighting fixtures, and despite being affixed or mounted to different cabinet/mounting structures 702A 702B, 702D, 702E. That is fixtures 701A 701B, and 701C are affixed or mounted to different cabinet/mounting structures (e.g., 702A, 702B) than fixtures 701D, 701E (e.g., 702C) and fixtures 701F and 701G (e.g., 702D, 702E). Further, there is distance between the fixtures that is immaterial to ability of the wall mount/removable remote control/computing device 702 and/or one or more of the other fixtures to control or configure any of the fixtures.

Figure 8A:
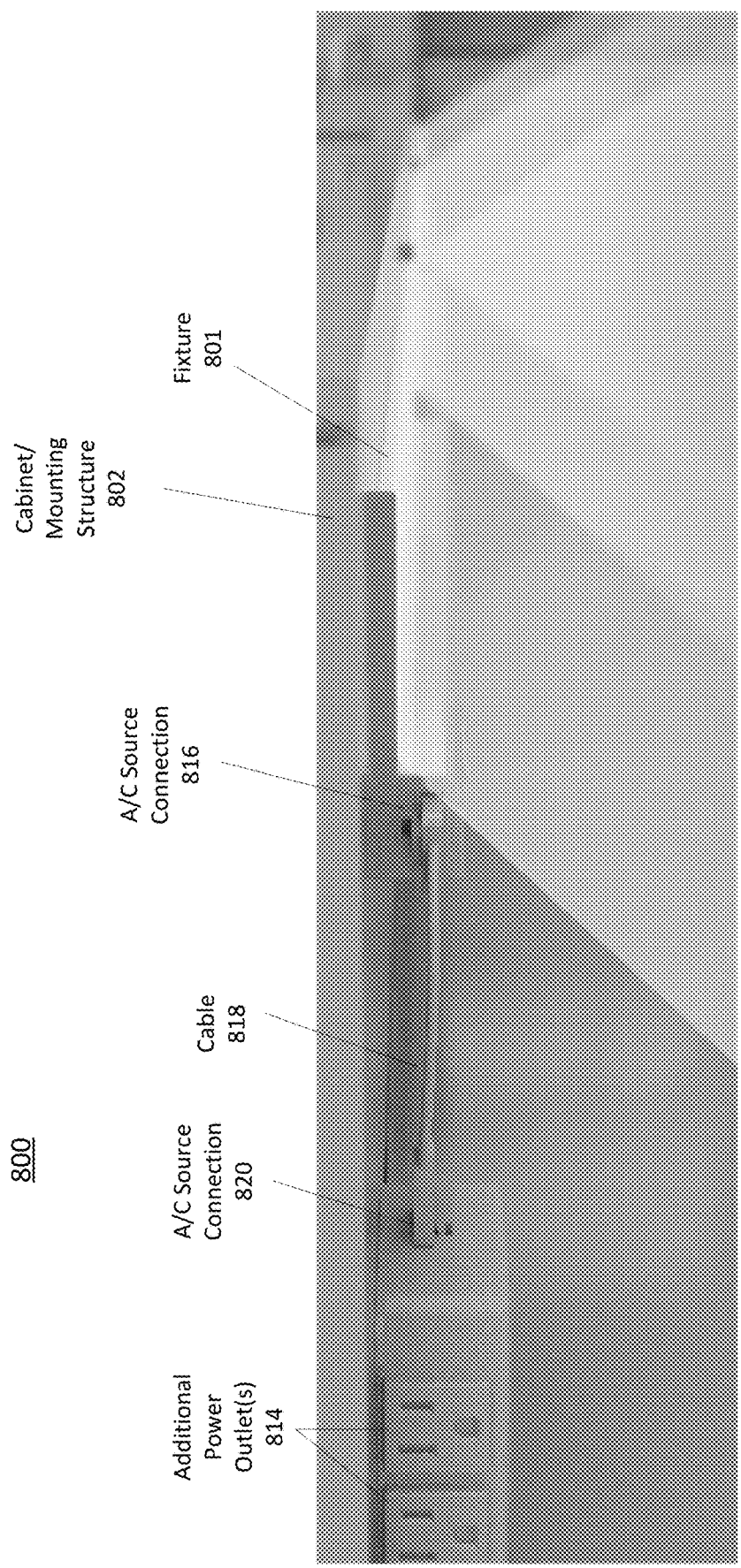
FIG. 8A illustrates example additional components for use with example embodiments of the present disclosure.
Figure 8B:
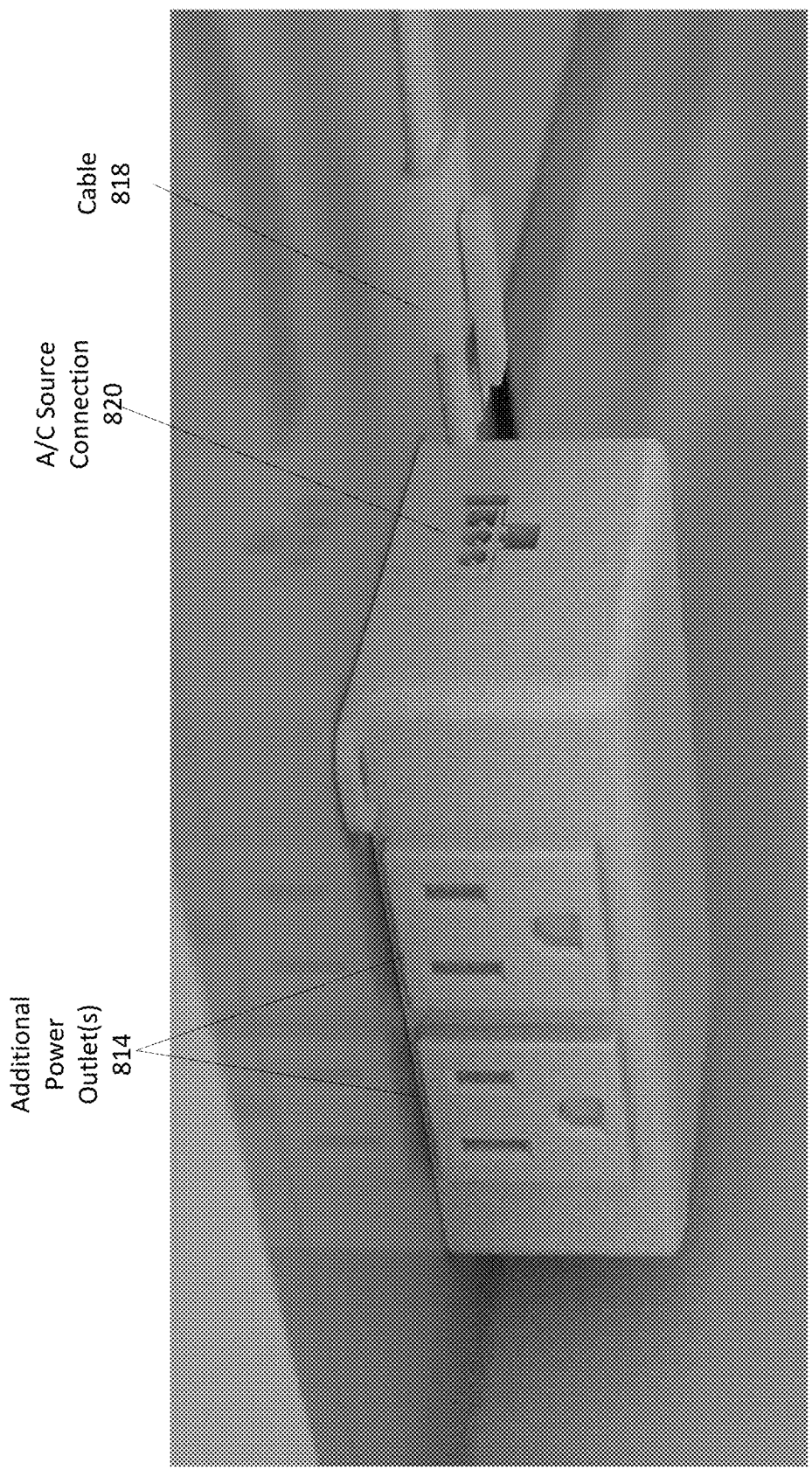
FIG. 8B illustrates example additional components for use with example embodiments of the present disclosure.

FIGS. 8A and 8B illustrate example additional components for use with example embodiments of the present disclosure. Shown in FIGS. 8A and 8B, because of the unique design of the example configurable controllable under cabinet lighting fixtures described herein, including a ground wire (e.g., see FIGS. 5A, 5B), additional accessories or components may be utilized along with the under cabinet lighting fixtures. For example, additional power outlets 814 may be optionally affixed to a cabinet or mounting structure 802 without requiring additional wiring for the environment or room within which the cabinet or mounting structure 802 is situated. In such embodiments, an example fixture 801 (e.g., according to embodiments herein), may include an A/C source connection 816 configured or adapted to connect by way of a cable 818 to an A/C source connection 820 of the additional power outlets 814. Such embodiments enable expansion of existing wiring within buildings or residences to include additional grounded power outlets without the expensive and complex tasks of adding or changing wiring, while maintaining a low profile appearance of an under cabinet lighting fixture 801.

Figure 9A:
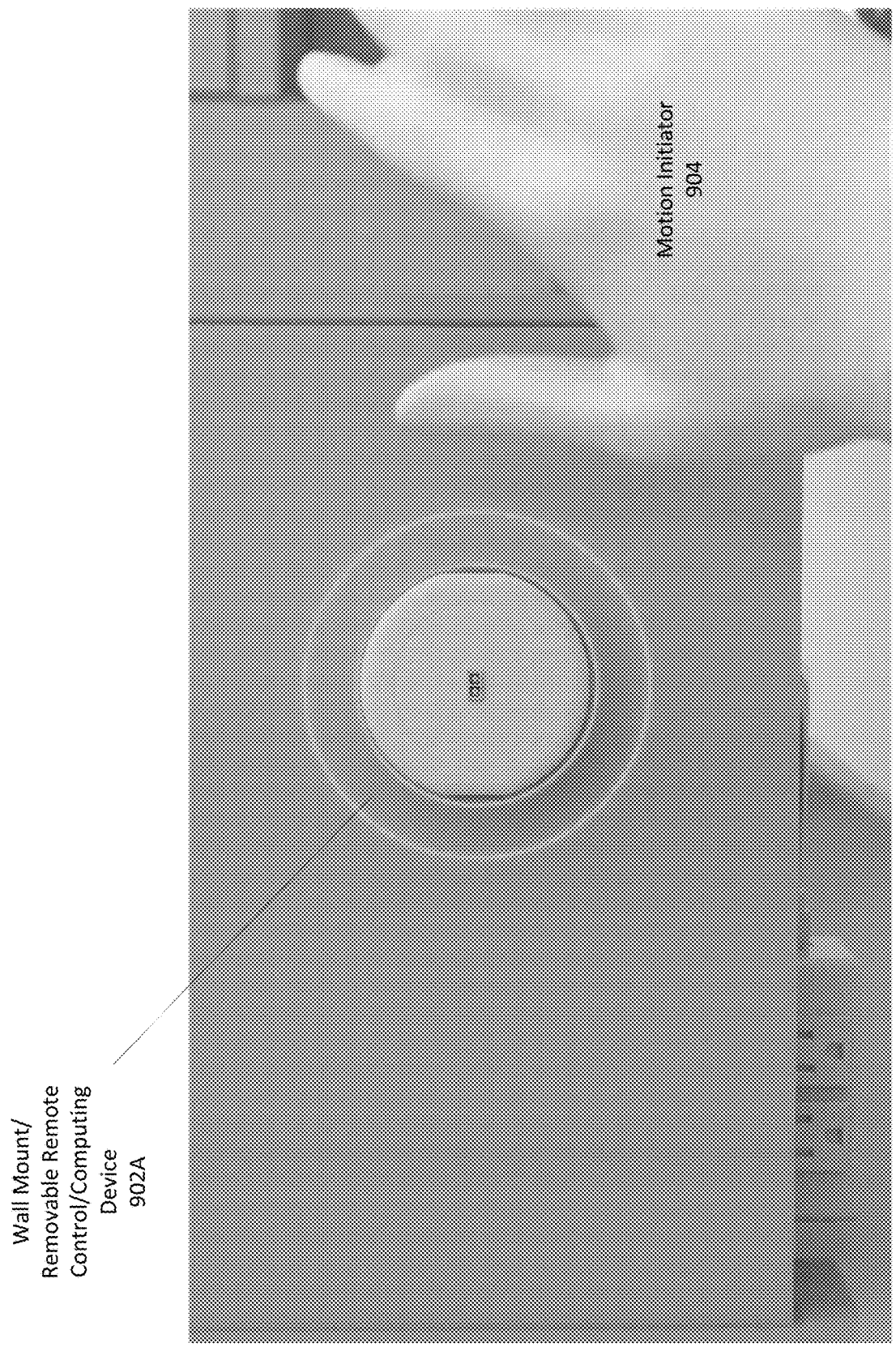
FIG. 9A illustrates an example wall mount/removable remote control/computing device for use with various embodiments of the present disclosure.

FIG. 9A illustrates an example wall mount/removable remote control/computing device for use with various embodiments of the present disclosure. In FIG. 9A, an example wall mount/removable remote control/computing device 902A may include a motion detection device such that lighting elements according to embodiments herein may be activated when the motion detection device detects motion provided by way of a motion initiator (e.g., a hand, a human walking past the motion detection device, etc.). Control circuitry of example controllable configurable under cabinet lighting fixtures may be configured to respond to signals provided to the control circuitry as a result of the motion detection device detecting one or more types or directions of motion. Such signals may also be provided to the control circuitry as a result of an absence of motion detected by the motion detection device for a given programmable threshold amount of time. It will be appreciated that the threshold amount of time after which a motion detection device may provide a signal to the control circuitry based on an absence of detected motion may be pre-programmed and/or adjustable according to user preferences (e.g., either manually or by way of a computing device or other configurability mechanism).

Figure 9C:
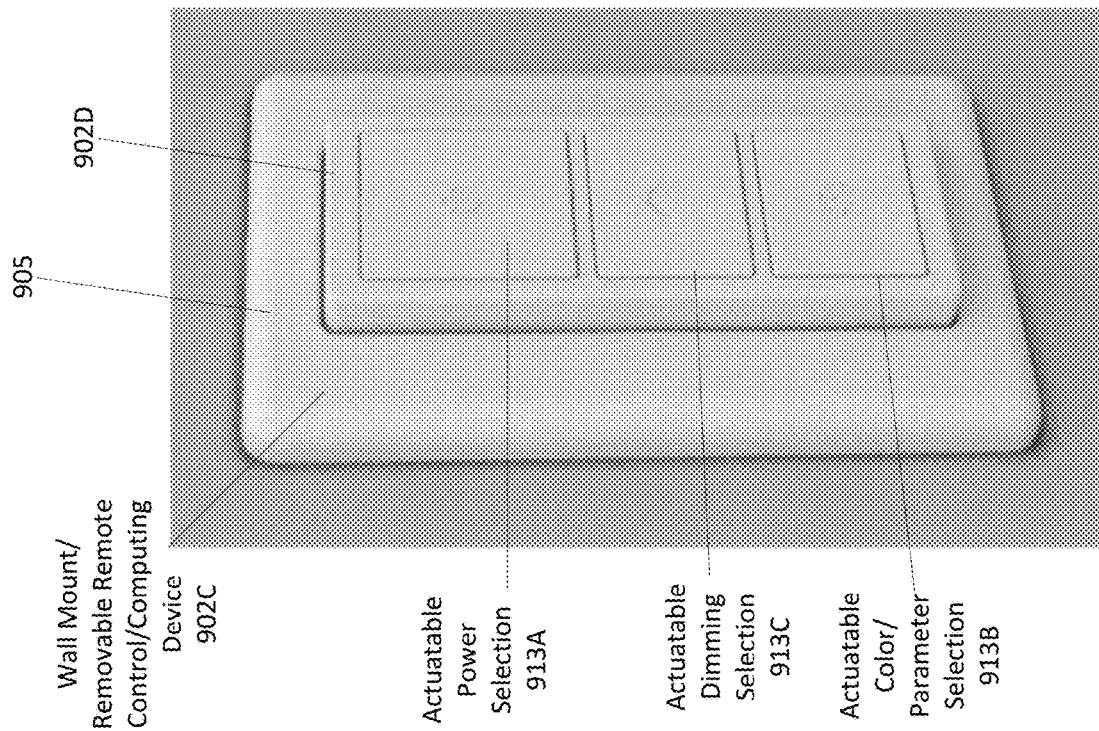
FIG. 9C illustrates an example wall mount/removable remote control/computing device for use with various embodiments of the present disclosure.
Figure 9B:
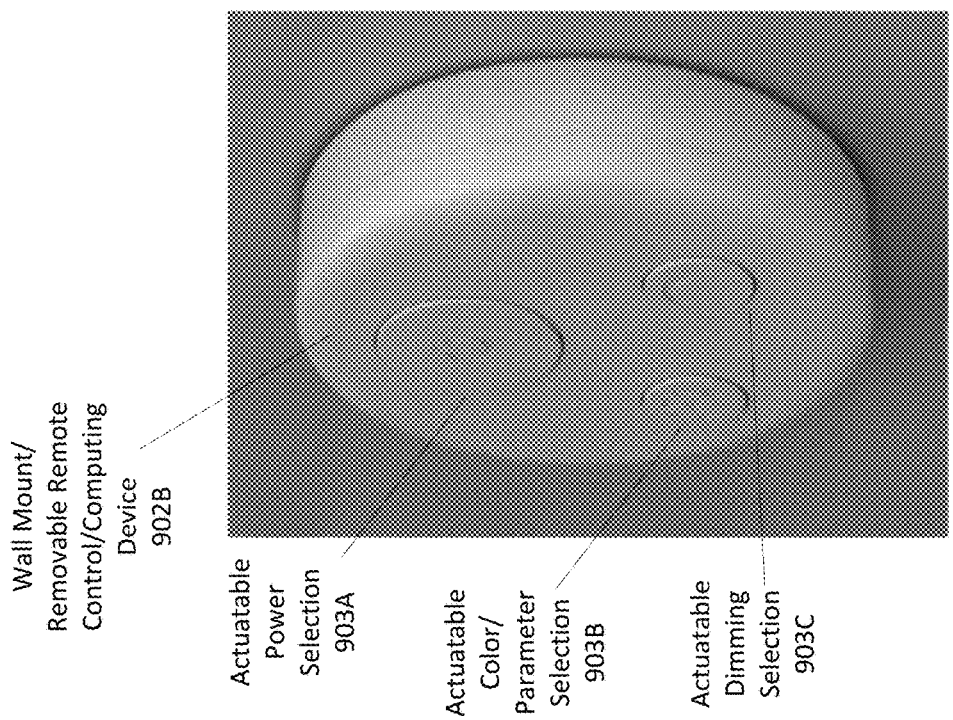
FIG. 9B illustrates an example wall mount/removable remote control/computing device for use with various embodiments of the present disclosure.

FIG. 9B illustrates an example wall mount/removable remote control/computing device for use with various embodiments of the present disclosure. In FIG. 9B, an example wall mount/removable remote control/computing device 902B may include a device having thereon actuatable selection buttons for physical actuation by a user. Control circuitry of example controllable configurable under cabinet lighting fixtures may be configured to respond to signals provided to the control circuitry as a result of actuation of one or more of the actuatable selection buttons by a user, including an actuatable power selection button 903A (e.g., for turning lights on and off), an actuatable color (e.g., CCT) or other parameter selection button 903B, and an actuatable dimming selection button 903C. It will be appreciated that the settings associated with the types and frequency of signals provided to the control circuitry based on actuation of one or more of the actuatable selection buttons may be pre-programmed and/or adjustable according to user preferences (e.g., either manually or by way of a computing device or other configurability mechanism).

FIG. 9C illustrates an example wall mount/removable remote control/computing device for use with various embodiments of the present disclosure. In FIG. 9C, an example wall mount/removable remote control/computing device 902C may include a device having thereon actuatable selection buttons for physical actuation by a user. Control circuitry of example controllable configurable under cabinet lighting fixtures may be configured to respond to signals provided to the control circuitry as a result of actuation of one or more of the actuatable selection buttons by a user, including an actuatable power selection button 913A (e.g., for turning lights on and off), an actuatable color (e.g., CCT) or other parameter selection button 913B, and an actuatable dimming selection button 913C. It will be appreciated that the settings associated with the types and frequency of signals provided to the control circuitry based on actuation of one or more of the actuatable selection buttons may be pre-programmed and/or adjustable according to user preferences (e.g., either manually or by way of a computing device or other configurability mechanism). It will further be appreciated that the example device 902C may include an inner removable remote device 902D that attaches to an outer wall mount 905.

Figure 9D:
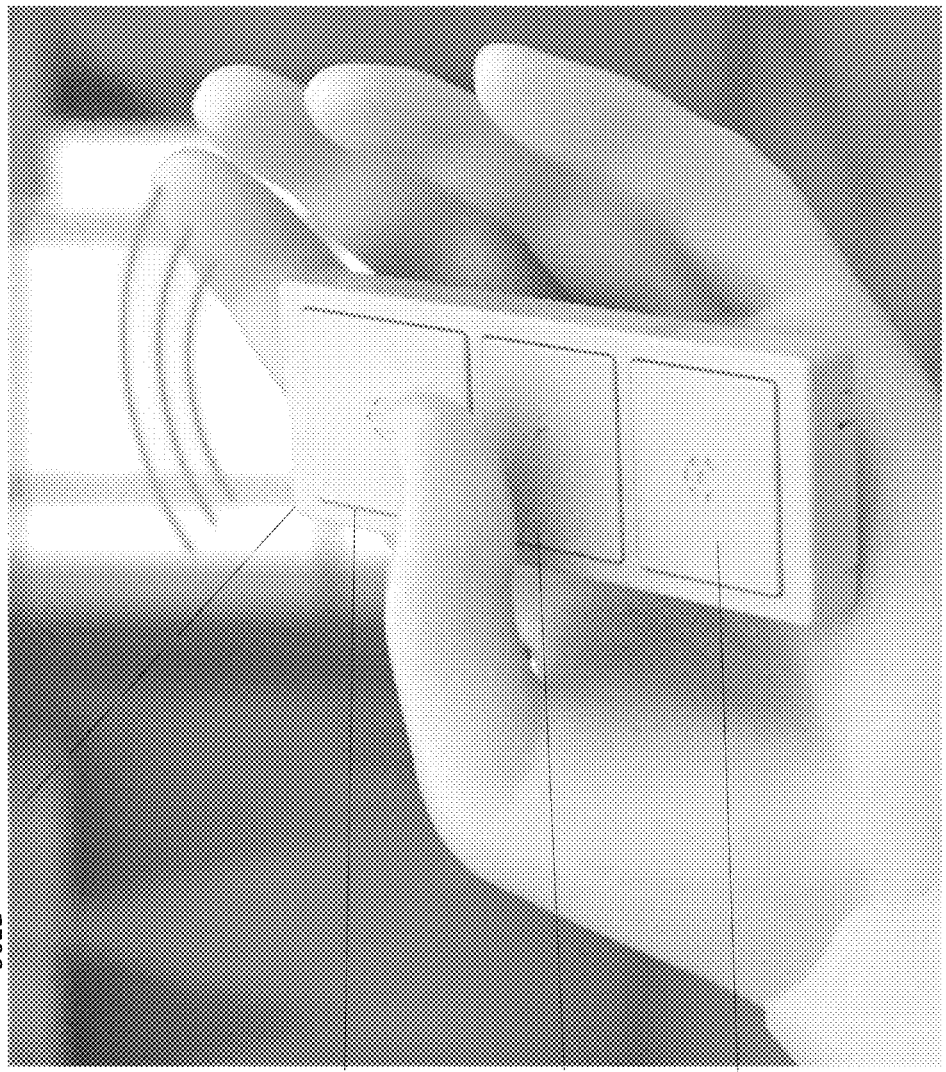
FIG. 9D illustrates an example wall mount/removable remote control/computing device for use with various embodiments of the present disclosure.

FIG. 9D illustrates an example wall mount/removable remote control/computing device for use with various embodiments of the present disclosure. In FIG. 9D, an example wall mount/removable remote control/computing device 902D may include a handheld device having thereon actuatable selection buttons for physical actuation by a user. Control circuitry of example controllable configurable under cabinet lighting fixtures may be configured to respond to signals provided to the control circuitry as a result of actuation of one or more of the actuatable selection buttons by a user, including an actuatable power selection button 923A (e.g., for turning lights on and off), an actuatable color (e.g., CCT) or other parameter selection button 923B, and an actuatable dimming selection button 923C. It will be appreciated that the settings associated with the types and frequency of signals provided to the control circuitry based on actuation of one or more of the actuatable selection buttons may be pre-programmed and/or adjustable according to user preferences (e.g., either manually or by way of a computing device or other configurability mechanism). It will further be appreciated that the example device 902D may be a handheld removable remote device that is mountable to an outer wall mount (e.g., 905 in FIG. 9C; e.g., by way of magnetic attachment or other removable affixing means).

Figure 9E:
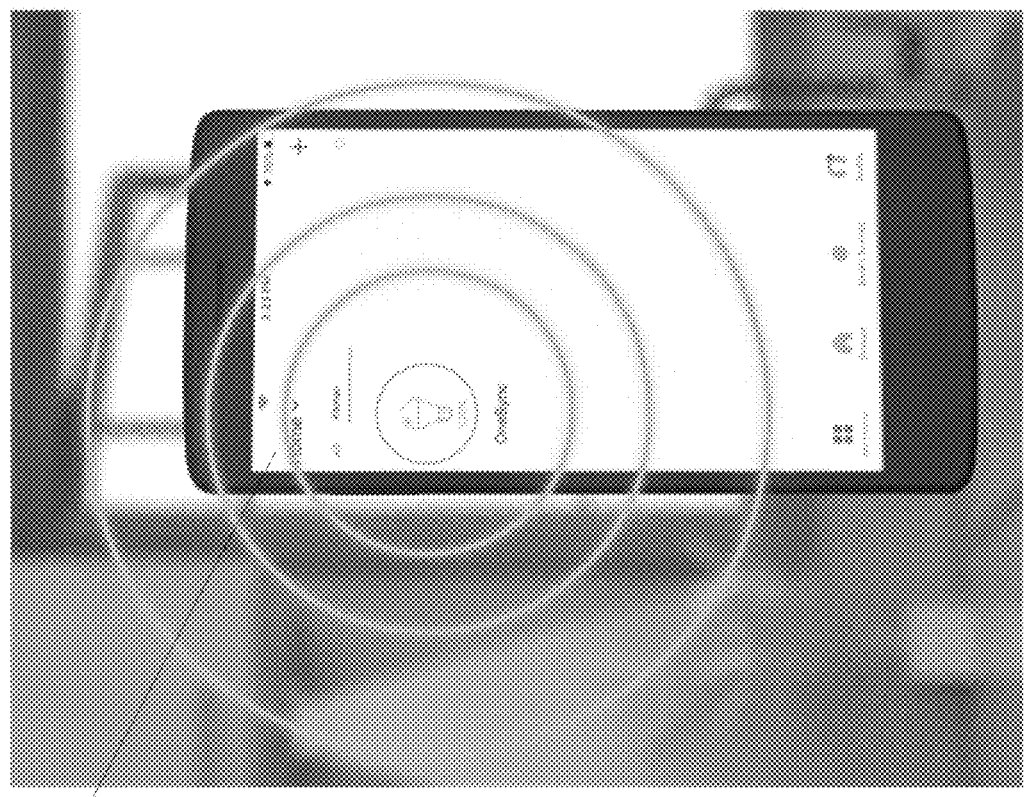
FIG. 9E illustrates an example wall mount/removable remote control/computing device for use with various embodiments of the present disclosure.

FIG. 9E illustrates an example wall mount/removable remote control/computing device for use with various embodiments of the present disclosure. In FIG. 9E, an example remote control/computing device 902E may include a smartphone or other mobile computing device that is configured to execute an "app" to interact with the control circuitry of exemplary controllable configurable under cabinet lighting fixtures herein. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. It will be appreciated that the computing device 902E may also be embodied by a voice activated control system (e.g., Google Home, Alexa, and the like).

Figure 10:
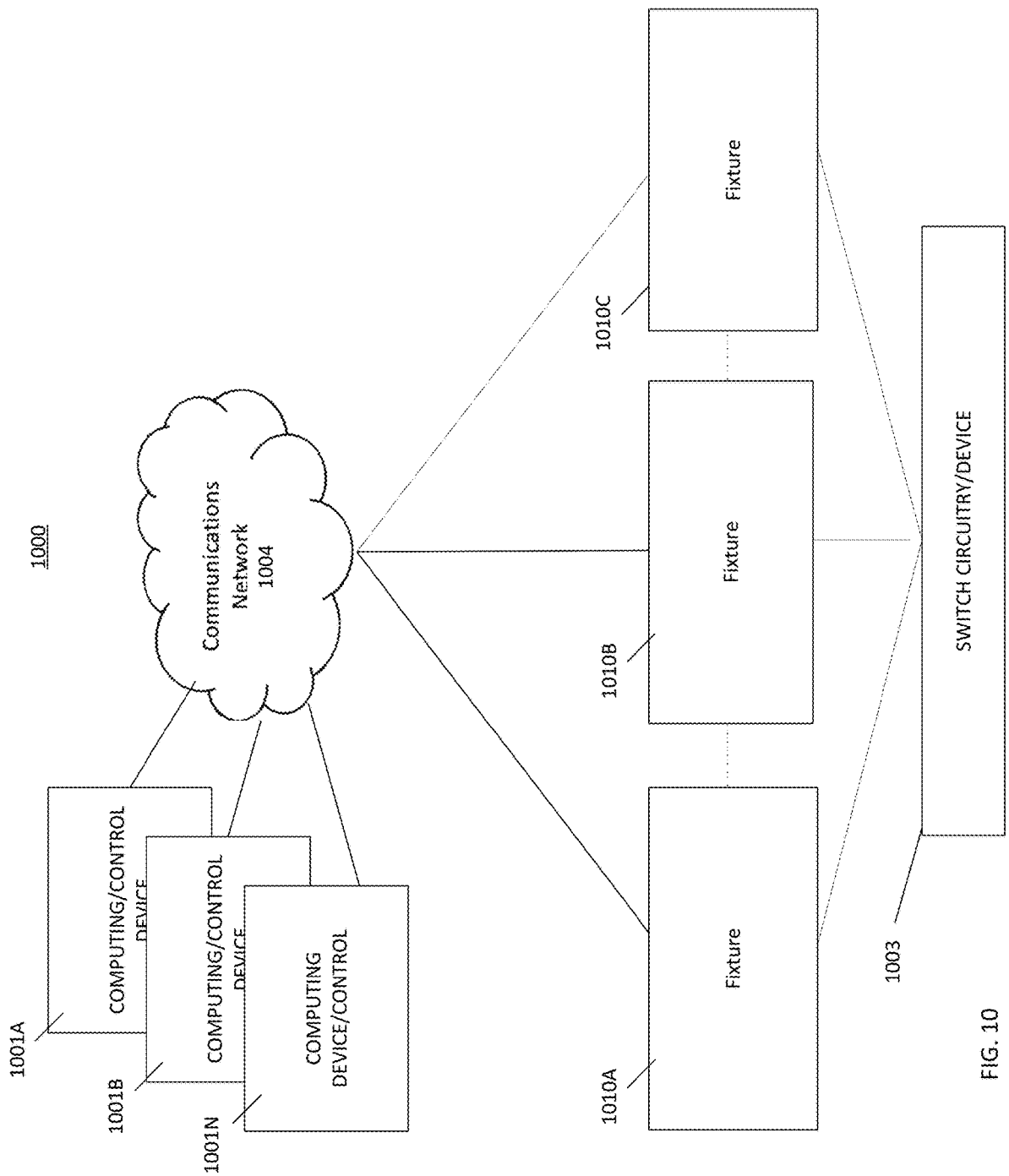
FIG. 10 illustrates an example system architecture for use with various embodiments of the present disclosure.

FIG. 10 illustrates an example system architecture 1000 within which embodiments of the present disclosure may operate. In FIG. 10, controllable configurable under cabinet lighting fixtures (e.g., 1010A, 1010B, 1010C) may include control circuitry (not shown in FIG. 10) configured to operate and/or customize operation of each of controllable configurable under cabinet lighting fixtures (e.g., 1010A, 1010B, 1010C). The control circuitry (not shown in FIG. 10) may be configured to communicate, by way of a communications network 1004, with one or more computing devices 1001A, 1001B, . . . 1001N. The control circuitry (not shown in FIG. 10) may be further configured to receive signals from wall mounted switch circuitry (e.g., a wall dimming assembly) or device 1003. Computing devices 1001A, 1001B, 1001N may be any mobile or other computing devices (e.g., mobile phone devices, voice activated devices, motion activated devices) or may be implemented by way of a remote control device. One or more of the controllable configurable under cabinet lighting fixtures (e.g., 1010A, 1010B, 1010C) may be paired (e.g., initially or later by choice of a user) with one another (e.g., via Bluetooth or other appropriate protocol).

Communications network 1004 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 1004 may include a cellular telephone, an 802.11, 802.16, 802.20, and/or WiMax network. Further, the communications network 1004 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the controllable multiple lighting element fixture system. In some embodiments, the protocol is a custom protocol of JSON objects sent via a Websocket channel. In some embodiments, the protocol is JSON over RPC, JSON over REST/HTTP, and the like.

In embodiments where a computing device 1001-1001N is a mobile device, such as a smart phone or tablet, the computing device 1001A-1001N may execute an "app" to interact with the control circuitry (not shown in FIG. 10). Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Figure 11:
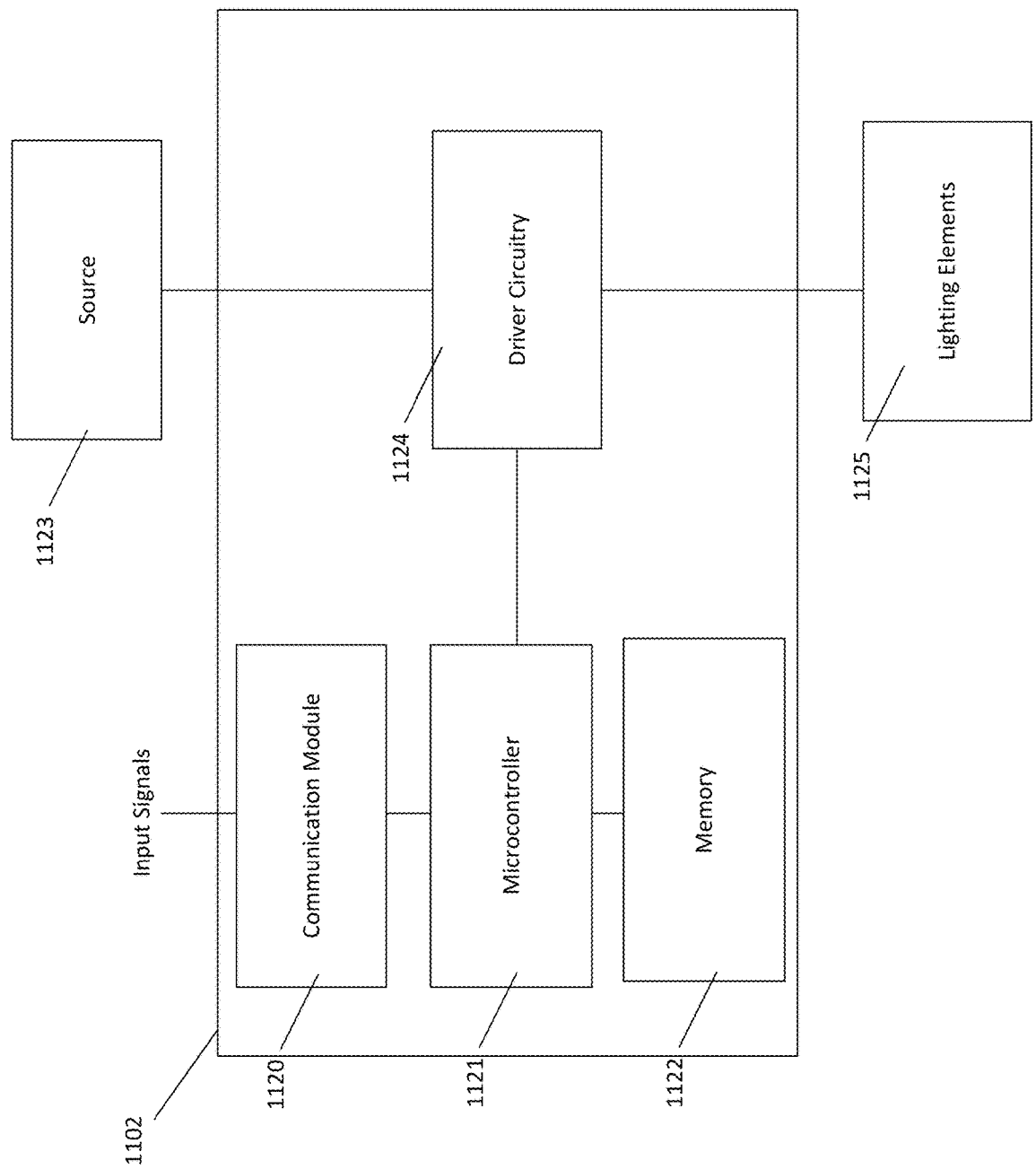
FIG. 11 illustrates an example device architecture (e.g., control circuitry) for an example configurable controllable under cabinet lighting fixture according to various embodiments of the present disclosure.

FIG. 11 illustrates example control circuitry for use with various embodiments of the present disclosure. In FIG. 11, example control circuitry 1102 may include a communication module 1120 for receiving input signals from a remote computing device and/or switch circuitry. A microcontroller 1121 of the control circuitry 1102 may control operation of the control circuitry 1102 according to received signals. The control circuitry 1102 may further include driver circuitry for adjusting parameters for one or more lighting elements controlled by the control circuitry 1102. The driver circuitry 1124 may be situated such that it controls the supply of a power source 1123 to the one or more lighting elements 1125 (e.g., adjusts a supply voltage).

Figure 12:
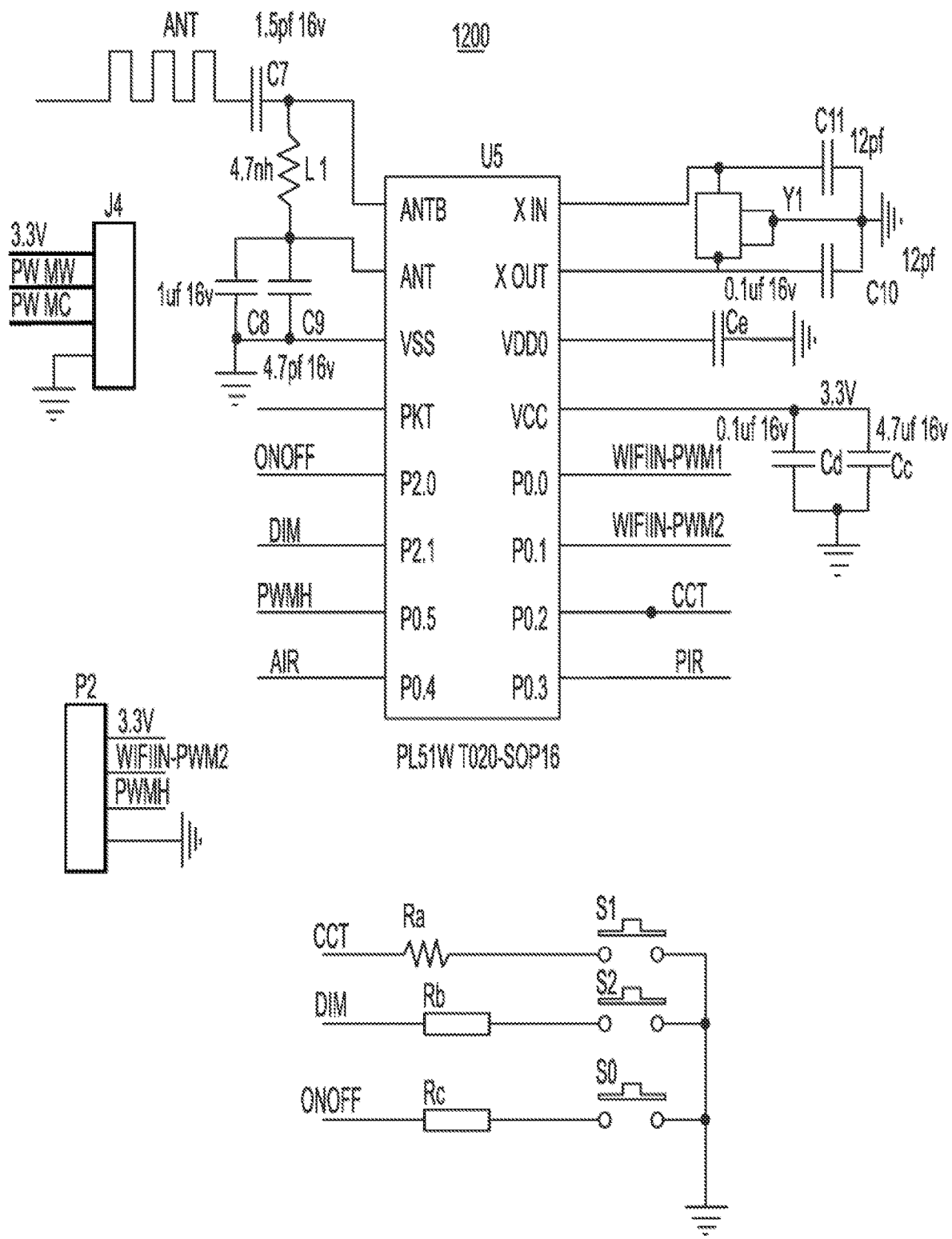
FIG. 12 illustrates an example wireless integrated circuit (IC) for use with embodiments of the present disclosure.

FIG. 12 illustrates an example wireless integrated circuit (IC) 1200 for use with embodiments of the present disclosure. In embodiments, a wireless integrated circuit (IC) 1200 may be included in example control circuitry (e.g., see FIG. 11) of a controllable configurable under cabinet lighting element fixture herein, either in addition to or in place of the microcontroller described above. In embodiments, a wireless IC 1200 enables direct communication between and control over other under cabinet lighting fixtures by a given under cabinet lighting element fixture within a certain radius (e.g., 50 feet). Such a feature is an improvement over existing systems because it enables control of under cabinet lighting fixtures regardless of gaps between lights due to gaps between mounting fixtures or cabinets resulting from gaps between windows, refrigerators, ovens, doorways, or other existing structures in an environment where the fixtures are installed and used. While the wireless IC 1200 depicted in FIG. 12 is a Powerlink Microelectronics PL51WT020, it will be appreciated that any wireless IC capable of achieving the objectives described herein remains within the scope of the present disclosure. That is, the wireless IC 1200 in FIG. 12 is merely an example and is not intended to limit the present disclosure or claims.

Figure 13:
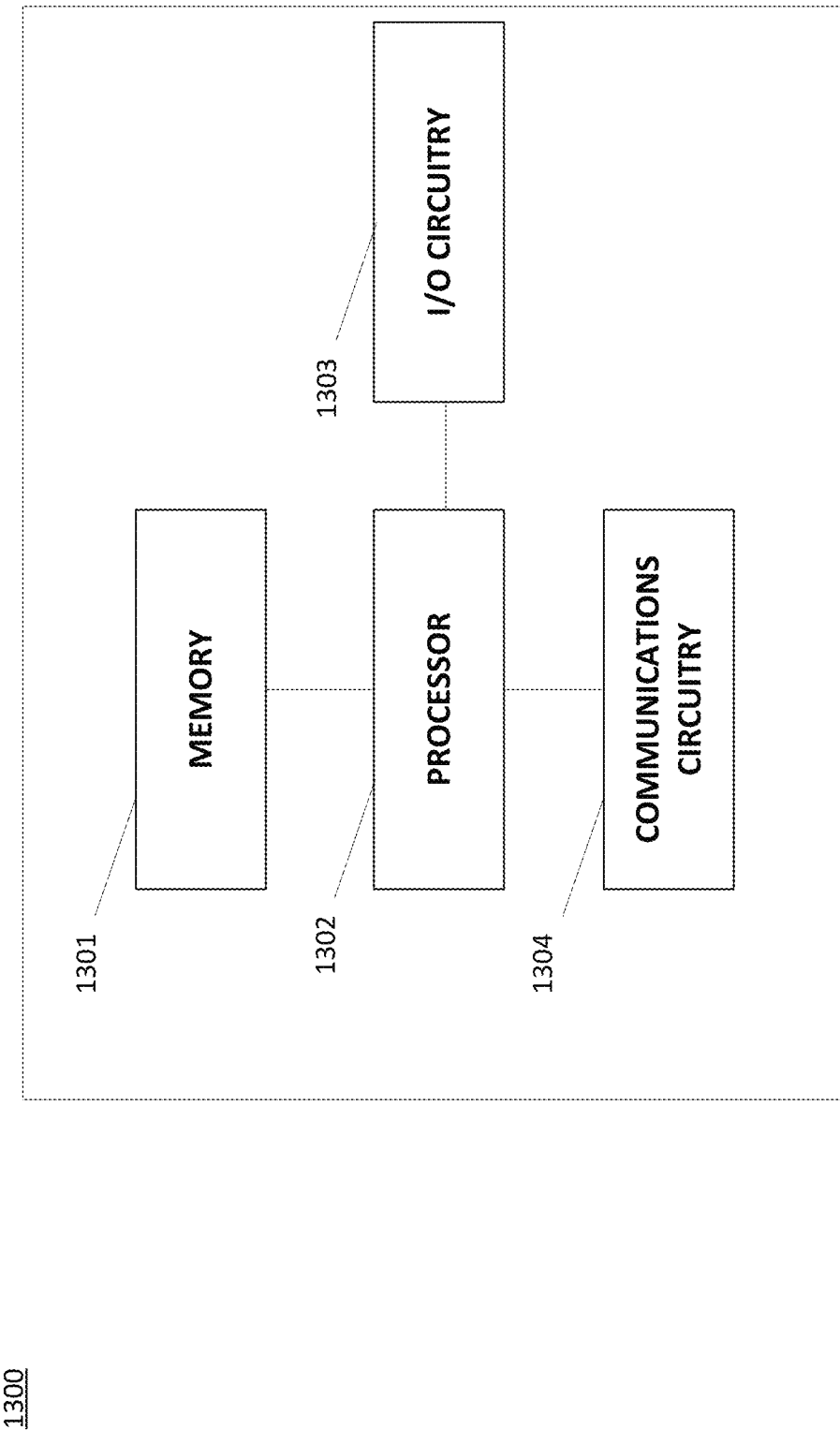
FIG. 13 illustrates an example computing or otherwise control apparatus for use with embodiments of the present disclosure.

FIG. 13 illustrates an example computing or otherwise control apparatus for use with embodiments of the present disclosure. A computing or otherwise control device 1001-1001N (e.g., smart or mobile phone, voice activated computing or control device, remote control, and the like) may be embodied by one or more computing systems, such as apparatus 1300 shown in FIG. 13. The apparatus 1300 may include, among other circuitry not shown, a processor 1302, a memory 1301, input/output circuitry 1303, and communications circuitry 1304. The apparatus 1300 may be configured to execute the operations described herein (e.g., controlling operability and parameters of controllable configurable under cabinet lighting fixtures herein). Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 900 may provide or supplement the functionality of particular circuitry. For example, the processor 902 may provide processing functionality, the memory 901 may provide storage functionality, the communications circuitry 905 may provide network interface functionality, and the like.

In some embodiments, the processor 1302 (and/or co-processor or any other processing circuitry assisting or otherwise associated with the processor) may be in communication with the memory 1301 via a bus for passing information among components of the apparatus. The memory 1301 may be non-transitory and may include, for example, one or more volatile and/or non-volatile memories. In other words, for example, the memory may be an electronic storage device (e.g., a computer readable storage medium). The memory 1301 may be configured to store information, data, content, applications, instructions, or the like, for enabling the apparatus to carry out various functions in accordance with example embodiments of the present disclosure.

The processor 1302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 1302 may be configured to execute instructions stored in the memory 1301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 1300 may include input/output circuitry 1303 that may, in turn, be in communication with processor 1302 to provide output to the user and, in some embodiments, to receive an indication of a user input. The input/output circuitry 1303 may comprise a user interface and may include a display and may comprise a web user interface, a mobile application, a client device, a kiosk, or the like. In some embodiments, the input/output circuitry 1303 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 1301, and/or the like).

The communications circuitry 1304 may be any means such as a device or circuitry embodied in either hardware or a combination of hardware and software that is configured to receive and/or transmit data from/to a network and/or any other device, circuitry, or module in communication with the apparatus 1300. In this regard, the communications circuitry 1305 may include, for example, a network interface for enabling communications with a wired or wireless communication network. For example, the communications circuitry 1305 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The foregoing Detailed Description signifies in isolation the individual features, structures, functions, or characteristics described herein and any combination of two or more such features structures functions or characteristics to the extent that such features structures, functions or characteristics or combinations thereof are based on the present specification as a whole in light of the knowledge of a person skilled in the art, irrespective of whether such features structures functions or characteristics or combinations thereof, solve any problems disclosed herein, and without limitation to the scope of the claims. When an embodiment of a claimed invention comprises a particular feature, structure, function or characteristic, it is within the knowledge of a person skilled in the art to use such feature structure function or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A configurable controllable under cabinet lighting fixture, comprising:
   one or more lighting elements positioned along a lighting fixture housing from a proximal end of the lighting fixture housing to a distal end of the lighting fixture housing;
   circuitry configured to control one or more first parameters associated with the one or more lighting elements and one or more second parameters associated with one or more nearby configurable controllable under cabinet lighting fixtures located within a proximity threshold of the configurable controllable under cabinet lighting fixture,
wherein the lighting fixture housing is configured for affixing to a downward facing surface of a mounting surface.

2. The configurable controllable under cabinet lighting fixture of claim 1, wherein illumination from the one or more lighting elements travels away from the downward facing surface of the mounting surface.

3. The configurable controllable under cabinet lighting fixture of claim 1, wherein the proximity threshold is fifty (50) feet.

4. The configurable controllable under cabinet lighting fixture of claim 1, wherein a first width from the proximal end of the lighting fixture housing to the distal end of the lighting fixture housing is 9.5 inches.

5. The configurable controllable under cabinet lighting fixture of claim 1, wherein a first width from the proximal end of the lighting fixture housing to the distal end of the lighting fixture housing is one or more of 20.5 inches, 14.5 inches, or 32.5 inches.

6. The configurable controllable under cabinet lighting fixture of claim 1, wherein a first width from the proximal end of the lighting fixture housing to the distal end of the lighting fixture housing is less than a second width of the mounting surface.

7. The configurable controllable under cabinet lighting fixture of claim 1, wherein the mounting surface is a cabinet.

8. The configurable controllable under cabinet lighting fixture of claim 1, further comprising a first lumens per mounting surface measurement unit associated with a second width of the mounting surface.

9. The configurable controllable under cabinet lighting fixture of claim 8, wherein a first nearby configurable controllable under cabinet lighting fixtures located within a proximity threshold of the configurable controllable under cabinet lighting fixture comprises a second lumens per mounting surface measurement unit associated with a unique mounting surface to it is affixed.

10. The configurable controllable under cabinet lighting fixture of claim 9, wherein the first lumens per mounting surface measurement unit and the second lumens per mounting surface measurement unit are equivalent.

11. The configurable controllable under cabinet lighting fixture of claim 10, wherein the second width of the mounting surface is different from a third width associated with the unique mounting surface.

12. The configurable controllable under cabinet lighting fixture of claim 11, wherein the first lumens per mounting surface measurement unit and the second lumens per mounting surface measurement unit are 62.5 lumens per inch.

13. The configurable controllable under cabinet lighting fixture of claim 1, wherein the configurable controllable under cabinet lighting fixture is associated with a first lighting zone of a plurality of lighting zones.

14. The configurable controllable under cabinet lighting fixture of claim 13, wherein each nearby configurable controllable under cabinet lighting fixture is associated with a unique lighting zone of the plurality of lighting zones.

15. The configurable controllable under cabinet lighting fixture of claim 14, wherein the plurality of lighting zones may overlap.

16. The configurable controllable under cabinet lighting fixture of claim 13, wherein the first lighting zone is associated with a downward lighting zone extending downward from the lighting fixture housing.

17. The configurable controllable under cabinet lighting fixture of claim 1, wherein the circuitry is responsive to signals received from a remote computing device.

18. The configurable controllable under cabinet lighting fixture of claim 1, wherein the circuitry is responsive to signals received from wall mounted switch circuitry.

19. The configurable controllable under cabinet lighting fixture of claim 1 wherein the one or more parameters include one or more of direction, color, temperature, dim level, or voltage.

20. The configurable controllable under cabinet lighting fixture of claim 1, wherein the circuitry comprises driver circuitry for controlling the one or more parameters.

21. The configurable controllable under cabinet lighting fixture of claim 1, wherein the one or more lighting elements comprise edge lit lighting elements.

22. The configurable controllable under cabinet lighting fixture of claim 1, wherein the one or more lighting elements comprise back lit lighting elements.

23. The configurable controllable under cabinet lighting fixture of claim 1, wherein the one or more lighting elements comprise light emitting diodes.

24. The configurable controllable tinder cabinet lighting fixture of claim 1, wherein the circuitry comprises a ground wire for configuring the circuitry to supply power to one or more grounded power outlet accessories affixed to the downward facing surface of the mounting surface.

25. The configurable controllable under cabinet lighting fixture of claim 24, wherein the circuitry is configured such that power is continuously supplied to the one or more grounded power outlet accessories when power is discontinued to the one or more lighting elements.

26. The configurable controllable under cabinet lighting fixture of claim 1, wherein the circuitry comprises one or more AC power connections usable as power source connections or power supply connections.

27. The configurable controllable under cabinet lighting fixture of claim 1, wherein the one or more nearby configurable controllable under cabinet lighting fixtures located within a proximity threshold of the configurable controllable tinder cabinet lighting fixture comprise one or more of bar lighting elements, rope lighting elements, tape lighting elements, or puck lighting elements.

28. A method of controlling a configurable controllable under cabinet lighting fixture, the method comprising:
controlling, using circuitry, one or more first parameters associated with one or more lighting elements positioned along a lighting fixture housing from a proximal end of the lighting fixture housing to a distal end of the lighting fixture housing of the configurable controllable under cabinet lighting fixture, wherein the lighting fixture housing is configured for affixing to a downward facing surface of a mounting surface; and
controlling, using the circuitry, one or more second parameters associated with one or more nearby configurable controllable under cabinet lighting fixtures located within a proximity threshold of the configurable controllable under cabinet lighting fixture.

* * * * *

UNITED STATES PATENT AND TRADEMARK OFFICE
CERTIFICATE OF CORRECTION

PATENT NO. : 11,147,136 B1
APPLICATION NO. : 17/116393
DATED : October 12, 2021
INVENTOR(S) : Igo et al.

It is certified that error appears in the above-identified patent and that said Letters Patent is hereby corrected as shown below:

In the Claims

Column 18,
Line 28, Claim 24, "tinder cabinet lighting" should read --under cabinet lighting--;
Line 46, Claim 27, "tinder cabinet lighting" should read --under cabinet lighting--.

Signed and Sealed this
Fourth Day of October, 2022

Katherine Kelly Vidal
*Director of the United States Patent and Trademark Office*